US009894641B2

(12) United States Patent
Ding et al.

(10) Patent No.: US 9,894,641 B2
(45) Date of Patent: Feb. 13, 2018

(54) METHODS AND APPARATUS FOR IMPLEMENTING MULTIPLE USER UPLINK MEDIUM ACCESS CONTROL PROTOCOLS IN A WIRELESS NETWORK

(71) Applicant: QUALCOMM Incorporated, San Diego, CA (US)

(72) Inventors: Gang Ding, San Diego, CA (US); Simone Merlin, San Diego, CA (US); Gwendolyn Denise Barriac, Encinitas, CA (US); George Cherian, San Diego, CA (US); Yan Zhou, San Diego, CA (US); Qingjiang Tian, San Diego, CA (US); Vinay Praneeth Boda, Hyattsville, MD (US)

(73) Assignee: QUALCOMM, Incorporated, San Diego, CA (US)

( * ) Notice: Subject to any disclaimer, the term of this patent is extended or adjusted under 35 U.S.C. 154(b) by 209 days.

(21) Appl. No.: 14/864,734

(22) Filed: Sep. 24, 2015

(65) Prior Publication Data
US 2016/0095139 A1 Mar. 31, 2016

Related U.S. Application Data

(60) Provisional application No. 62/056,396, filed on Sep. 26, 2014.

(51) Int. Cl.
*H04W 72/04* (2009.01)
*H04B 7/04* (2017.01)
(Continued)

(52) U.S. Cl.
CPC ...... *H04W 72/0413* (2013.01); *H04B 7/0452* (2013.01); *H04L 5/0055* (2013.01);
(Continued)

(58) Field of Classification Search
CPC .... H04B 7/024; H04B 7/0413; H04B 7/0452; H04B 7/0495; H04W 28/26; H04W 28/24;
(Continued)

(56) References Cited

U.S. PATENT DOCUMENTS

2011/0077044 A1* 3/2011 Sampath ............. H04W 52/146
455/522
2011/0150004 A1 6/2011 Denteneer et al.
(Continued)

FOREIGN PATENT DOCUMENTS

WO WO-2011112741 A1 9/2011

OTHER PUBLICATIONS

International Search Report and Written Opinion—PCT/US2015/052365—ISA/EPO—dated Jan. 18, 2016.

*Primary Examiner* — Ashley Shivers
(74) *Attorney, Agent, or Firm* — Knobbe, Martens, Olson & Bear LLP

(57) ABSTRACT

A user terminal for multiple-user wireless communication is provided, comprising a transmit buffer configured to store uplink data for transmission. The user terminal comprises a processor configured to generate a request to transmit frame in response to uplink data being present in the transmit buffer, and initiate a transmit timer for determining when to transmit the request to transmit frame. The user terminal comprises a transmitter configured to transmit the request to transmit frame when the transmit timer expires or when the uplink data present in the transmit buffer exceeds a threshold amount. The user terminal comprises a receiver configured to receive a clear to transmit frame from an access point based on the transmitted request to transmit frame. The transmitter is further configured to transmit the uplink data present in the transmit buffer, concurrently with at least one other user terminal transmitting uplink data, to the access
(Continued)

point at a specified time based on receiving the clear to transmit frame addressed to the user terminal.

30 Claims, 13 Drawing Sheets

(51) Int. Cl.
*H04W 72/02* (2009.01)
*H04W 72/12* (2009.01)
*H04W 28/26* (2009.01)
*H04B 7/0452* (2017.01)
*H04L 5/00* (2006.01)
*H04W 28/04* (2009.01)
*H04W 74/06* (2009.01)
*H04W 74/04* (2009.01)
*H04W 84/12* (2009.01)

(52) U.S. Cl.
CPC ............ *H04W 28/04* (2013.01); *H04W 28/26* (2013.01); *H04W 72/02* (2013.01); *H04W 72/121* (2013.01); *H04W 72/1278* (2013.01); *H04W 74/04* (2013.01); *H04W 74/06* (2013.01); *H04W 84/12* (2013.01)

(58) Field of Classification Search
CPC ..... H04W 74/04; H04W 72/02; H04W 72/04; H04W 72/0406; H04W 72/0413; H04W 72/121; H04W 72/12; H04W 72/1263; H04W 72/1278
See application file for complete search history.

(56) References Cited

U.S. PATENT DOCUMENTS

| 2011/0268054 A1* | 11/2011 | Abraham | H04W 74/06 370/329 |
| 2011/0268094 A1 | 11/2011 | Gong et al. | |
| 2012/0224540 A1* | 9/2012 | Kwon | H04W 76/02 370/329 |
| 2013/0070670 A1* | 3/2013 | Wentink | H04L 1/0026 370/328 |
| 2014/0119288 A1* | 5/2014 | Zhu | H04W 74/0816 370/329 |
| 2015/0016558 A1* | 1/2015 | Choi | H04B 7/0452 375/267 |
| 2016/0066342 A1* | 3/2016 | Ma | H04W 72/1289 370/329 |
| 2016/0156497 A1* | 6/2016 | Yang | H04B 7/0452 370/328 |
| 2016/0345362 A1* | 11/2016 | Lee | H04W 74/0816 |

* cited by examiner

METHODS AND APPARATUS FOR IMPLEMENTING MULTIPLE USER UPLINK MEDIUM ACCESS CONTROL PROTOCOLS IN A WIRELESS NETWORK

CLAIM OF PRIORITY UNDER 35 U.S.C. § 119

The present Application for Patent claims priority to Provisional Application No. 62/056,396 entitled "METHODS AND APPARATUS FOR IMPLEMENTING MULTIPLE USER UPLINK MEDIUM ACCESS CONTROL PROTOCOLS IN A WIRELESS NETWORK" filed Sep. 26, 2014, and assigned to the assignee hereof. Provisional Application No. 62/056,396 is hereby expressly incorporated by reference herein.

BACKGROUND

Field

Certain aspects of the present disclosure generally relate to wireless communications, and more particularly, to methods and apparatus for implementing multiple user uplink (UL) medium access control (MAC) protocols in a wireless network.

Background

In many telecommunication systems, communications networks are used to exchange frames among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching, routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when multiple terminals send uplink communications to the access point, it is desirable to minimize the amount of overhead to complete the all uplink transmissions. Thus, there is a need for methods and apparatus for implementing multiple user uplink medium access control (MAC) protocols in a wireless network.

SUMMARY

One aspect of the disclosure provides an user terminal for multiple-user wireless communication. The user terminal comprises a transmit buffer configured to store uplink data for transmission. The user terminal comprises a processor configured to generate a request to transmit frame in response to uplink data being present in the transmit buffer, and initiate a transmit timer for determining when to transmit the request to transmit frame. The user terminal comprises a transmitter configured to transmit the request to transmit frame when the transmit timer expires or when the uplink data present in the transmit buffer exceeds a threshold amount. The user terminal comprises a receiver configured to receive a clear to transmit frame from an access point based on the transmitted request to transmit frame. The transmitter is further configured to transmit the uplink data present in the transmit buffer, concurrently with at least one other user terminal transmitting uplink data, to the access point at a specified time based on receiving the clear to transmit frame addressed to the user terminal.

Another aspect of the disclosure provides a method for multiple-user wireless communication. The method comprises storing uplink data in a transmit buffer. The method comprises generating a request to transmit frame in response to the uplink data being present in the transmit buffer. The method comprises initiating a transmit timer for determining when to transmit the request to transmit frame. The method comprises transmitting the request to transmit frame when the transmit timer expires or when the uplink data present in the transmit buffer exceeds a threshold amount. The method comprises receiving a clear to transmit frame from an access point based on the transmitted request to transmit frame. The method comprises transmitting the uplink data present in the transmit buffer, concurrently with at least one other user terminal transmitting uplink data, to the access point at a specified time based on receiving the clear to transmit frame addressed to the user terminal.

Another aspect of the disclosure provides a non-transitory computer readable medium comprising code that, when executed, causes a processor to perform a method. The method comprises storing uplink data in a transmit buffer. The method comprises generating a request to transmit frame in response to the uplink data being present in the transmit buffer. The method comprises initiating a transmit timer for determining when to transmit the request to transmit frame. The method comprises transmitting the request to transmit frame when the transmit timer expires or when the uplink data present in the transmit buffer exceeds a threshold amount. The method comprises receiving a clear to transmit frame from an access point based on the transmitted request to transmit frame. The method comprises transmitting the uplink data present in the transmit buffer, concurrently with at least one other user terminal transmitting uplink data, to the access point at a specified time based on receiving the clear to transmit frame addressed to the user terminal.

Another aspect of the disclosure provides an user terminal for multiple-user wireless communication. The user terminal comprises means for storing uplink data for transmission. The user terminal comprises means for generating a request to transmit frame in response to uplink data being present in the means for storing uplink data. The user terminal comprises means for initiating a transmit timer for determining when to transmit the request to transmit frame. The user terminal comprises means for transmitting the request to transmit frame when the transmit timer expires or when the uplink data present in the means for storing uplink data exceeds a threshold amount. The user terminal comprises means for receiving a clear to transmit frame from an access point based on the transmitted request to transmit frame. The user terminal comprises means for transmitting the uplink data present in the transmit buffer, concurrently with at least one other user terminal transmitting uplink data, to the access point at a specified time based on receiving the clear to transmit frame addressed to the user terminal.

Another aspect of the disclosure provides an access point for multiple-user wireless communication. The access point comprises a transmitter configured to transmit a clear to transmit message selectively addressed to one or more of a plurality of user terminals, the clear to transmit message indicating a specified time for each of the one or more of the plurality of user terminals to concurrently transmit uplink data to the access point. The access point comprises a receiver configured to receive an uplink data transmission from each of the plurality of user terminals at the specified time.

Another aspect of the disclosure provides a method for multiple-user wireless communication. The method comprises transmitting a clear to transmit message selectively addressed to one or more of a plurality of user terminals, the clear to transmit message indicating a specified time for each of the one or more of the plurality of user terminals to concurrently transmit uplink data to the access point. The method comprises receiving an uplink data transmission from each of the plurality of user terminals at the specified time.

Another aspect of the disclosure provides an access point for multiple-user wireless communication. The access point comprises means for transmitting a clear to transmit message selectively addressed to a one or more of a plurality of user terminals, the clear to transmit message indicating a specified time for each of the one or more of the plurality of user terminals to concurrently transmit uplink data to the access point. The access point comprises means for receiving an uplink data transmission from each of the plurality of user terminals at the specified time.

Another aspect of the disclosure provides a non-transitory computer readable medium comprising instructions that when executed cause a processor to perform a method. The method comprises transmitting a clear to transmit message selectively addressed to one or more of a plurality of user terminals, the clear to transmit message indicating a specified time for each of the one or more of the plurality of user terminals to concurrently transmit uplink data to the access point. The method comprises receiving an uplink data transmission from each of the plurality of user terminals at the specified time.

DETAILED DESCRIPTION

Figure 1:
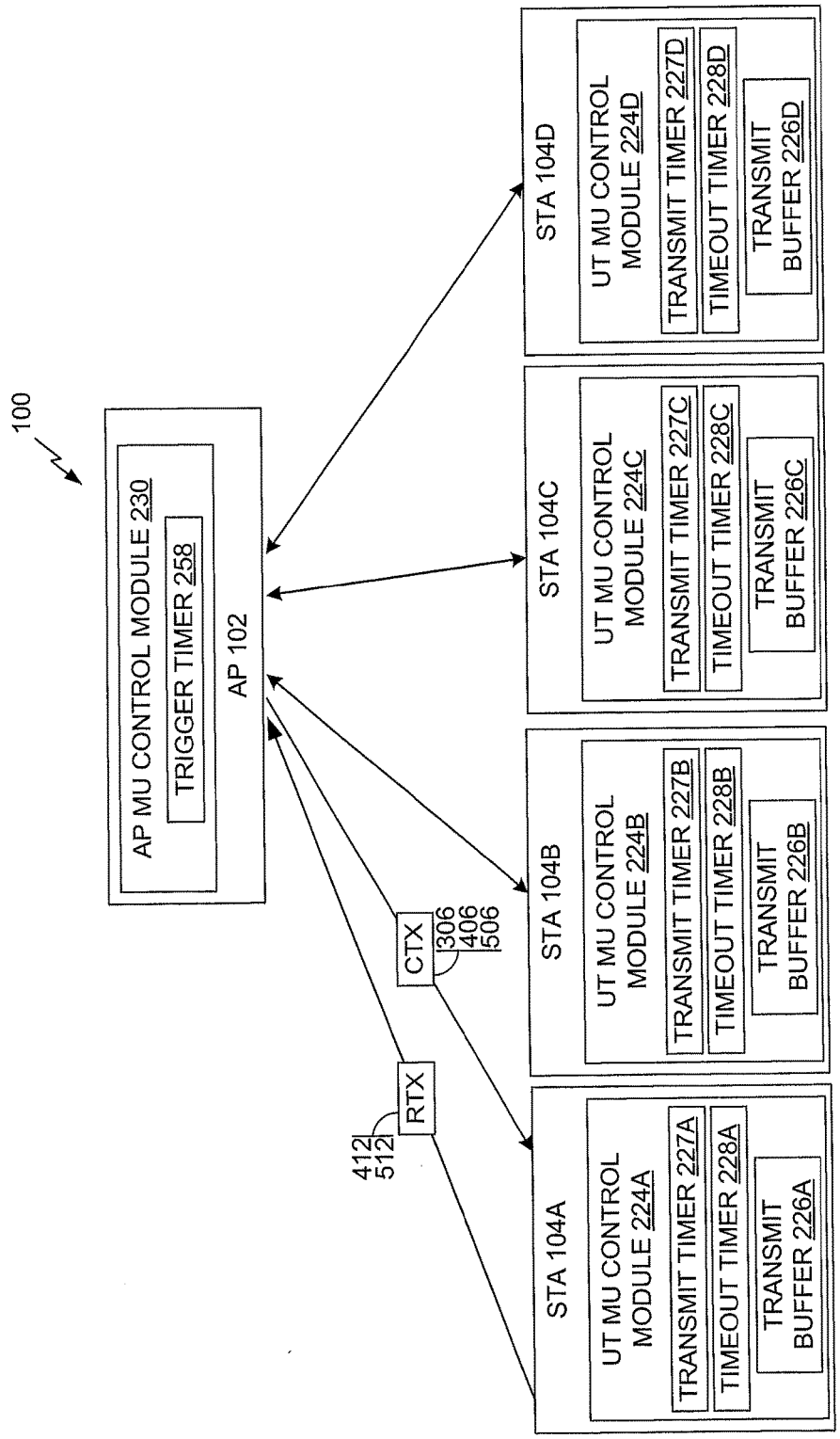
FIG. 1 illustrates a multiple-access wireless communication system with access points (APs) and user terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols. In some embodiments, a multiple-access wireless communication system 100 (see FIG. 1) is a WLAN that supports a multi-user communication on the uplink. Multi-user communication on the uplink involves communication by multiple user terminals (e.g., at least two user terminals concurrently with the access point). Future WLAN standards will incorporate this feature. For example, such future standards may include but are not limited to the future IEEE 802.11 ax standard, which may also be referred to as a high efficiency WLAN (HEWLAN) standard.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a high efficiency WLAN (HEW) includes various devices which are the components that access the wireless network. For example, there may be two types of devices: access points ("APs") and clients (also referred to as stations, or "user terminals"). In general, an AP serves as a hub or base station for the WLAN and a user terminal serves as a user of the WLAN. For example, a user terminal may be a laptop computer, a personal digital assistant (PDA), a mobile phone, etc. In an example, a user terminal connects to an AP via a Wi-Fi compliant wireless link to obtain general connectivity to the Internet or to other wide area networks. In some implementations a user terminal may also be used as an AP.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station "STA" may also comprise, be implemented as, or known as a user terminal, an access terminal ("AT"), a subscriber station, a subscriber unit, a mobile station, a remote station, a remote terminal, a user agent, a user device, user equipment, or some Other terminology. In some implementations an access terminal may comprise a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are transmitted in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

FIG. 1 illustrates a multiple-access wireless communication system 100 with access points (APs) and user terminals. For simplicity, only one access point 102 is shown in FIG. 1. An access point is generally a fixed station that communicates with the user terminals and may also be referred to as a base station or using some other terminology. A user terminal, also known as a station ("STA"), may be fixed or mobile and may also be referred to as a mobile station or a wireless device, or using some other terminology. The access point 102 may communicate with one or more user terminals 104A, 104B, 104C, 104D (hereinafter collectively user terminals 104A-104D) at any given moment on the downlink and uplink. The downlink (i.e., forward link) is any communication link from the AP 102 to any of the user terminals 104A-104D, and the uplink (i.e., reverse link) is any communication link from the user terminals 104A-104D to the AP 102. A user terminal may also communicate peer-to-peer with another user terminal.

The system 100 may employ multiple transmit and multiple receive antennas for data transmission on the downlink and uplink. For example, the AP 102 is equipped with $N_{ap}$ antennas (not shown in FIG. 1) and represents the multiple-input (MI) for downlink transmissions and the multiple-output (MO) for uplink transmissions. A set of K selected user terminals 104A-104D collectively represents the multiple-output for downlink transmissions and the multiple-input for uplink transmissions. Each selected user terminal 104A-104D may transmit user-specific data to and/or receive user-specific data from the access point. In general, each selected user terminal 104A-104D may be equipped with one or multiple antennas (i.e., $N_{ut} \geq 1$)(not shown in FIG. 1). The K selected user terminals can have the same number of antennas, or one or more user terminals may have a different number of antennas.

The system 100 may be a time division duplex (TDD) system or a frequency division duplex (FDD) system. For a TDD system, the downlink and uplink share the same frequency band. For an FDD system, the downlink and uplink use different frequency bands. The system 100 may also utilize a single carrier or multiple carriers for transmission. Each user terminal 104A-104D may be equipped with a single antenna (e.g., in order to keep costs down) or multiple antennas (e.g., where the additional cost can be supported). The system 100 may also be a TDMA system if the user terminals 104A-104D share the same frequency channel by dividing transmission, reception into different time slots, where each time slot may be assigned to a different user terminal 104A-104D. As shown in FIG. 1, the AP 102 may include an AP multiple-user (MU) control module 230, which may be configured to perform one or more tasks associated with the AP 102, as described in more detail in FIGS. 2-15 below. Moreover, each of the user terminals 104A-104D may include a user terminal (UT) multi-user (MU) control module 224A, 224B, 224C, 224D, respectively. The UT MU control modules 224A-224D will be described in more detail in connection with FIG. 2 below. Each of the user terminals 104A-104D may additionally include a transmit buffer 226A, 226B, 226C, 226D, respectively, a transmit timer 227A, 227B, 227C, 227D, respectively, and a timeout timer 228A, 228B, 228C, 228D, respectively. The operation of the transmit buffers 226A-226D, of the transmit timers 227A-227D and of the timeout timers 228A-228D will be described in more detail in connection with FIG. 2A, as well as one or more later FIGs. below. As shown in FIG. 1, each of the user terminals 104A-104D may be configured to transmit a request to transmit (RTX) frame 412, 512 to the AP 102 under conditions that will be described in more detail below, and receive a clear to transmit (CTX) frame 306, 406, 506 from the AP 102 under conditions that will be described in more detail below.

Figure 2A:
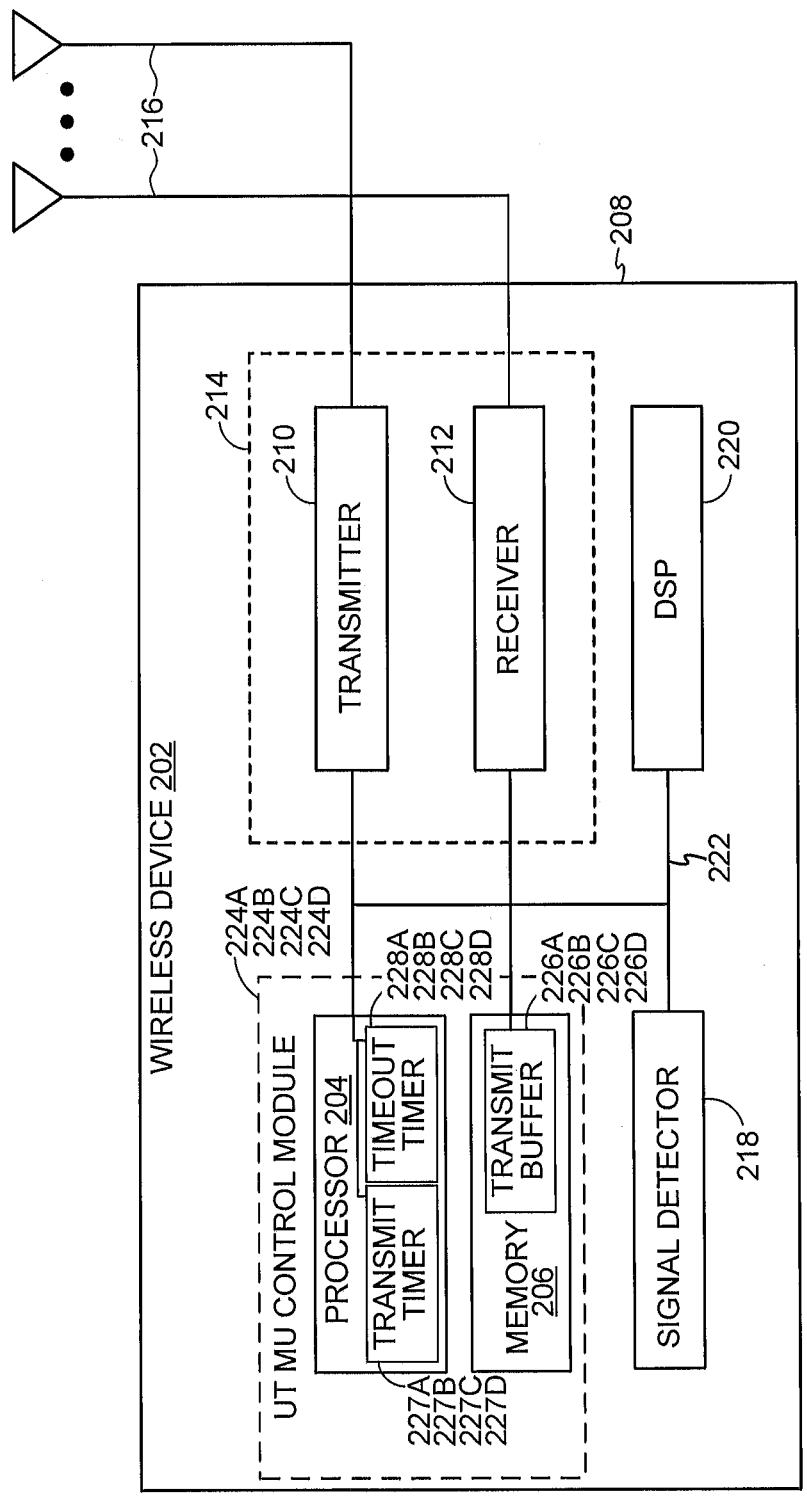
FIG. 2A illustrates various components that may be utilized in a wireless device that may be employed within the wireless communication system of FIG. 1.

FIG. 2A illustrates various components that may be utilized in a wireless device 202 that may be employed within the wireless communication system 100. The wireless device 202 is an example of a device that may be configured to implement the various methods described herein. The wireless device 202 may implement any of the user terminals 104A-104D.

The wireless device 202 may include the UT UL control module 224A, 224B, 224C, 224D, which may include a processor 204 which controls operation of the wireless device 202. The processor 204 may also be referred to as a central processing unit (CPU). In some implementations, the UT UL control module 224A, 224B, 224C, 224D may additionally comprise memory 206, which may include both read-only memory (ROM) and random access memory (RAM) and provides instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein. In some implementations, the processor 204 may comprise a transmit timer 227A, 227B, 227C, 227D and a timeout timer 228A, 228B, 228C, 228D, each having functionality as will be describe in more detail in connection with one or more figures below. In some implementations, the memory 206 may comprise a transmit buffer 226A, 226B, 226C, 226D, which may also be referred to as or may comprise at least a portion of "means for storing uplink data for transmission."

The processor 204 may comprise or be a component of a processing system implemented with one or more processors. In at least some implementations, the processor 204 may also be referred to as or may comprise at least a portion of "means for generating a request to transmit (RTX) frame," "means for initiating a transmit timer for determining when to transmit the RTX frame," "means for initiating a timeout timer when the transmitter transmits the RTX frame," "means for configuring at least one of a timeout value of the transmit timer and the threshold amount of uplink data," "means for generating a polling response frame comprising the uplink information associated with the apparatus in response to receiving the polling request frame," and/or "means for inserting the uplink information associated with the apparatus into one or more bits of one or both of a sequence control field or a quality of service control field of the polling response frame."

The processing system may also include non-transitory, computer-readable media comprising code. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transceiver antennas 216 may be attached to the housing 208 and electrically coupled to the transceiver 214. In some implementations, the transmitter 210 may also be referred to as or may comprise at least a portion of "means for transmitting the RTX frame," "means for transmitting the uplink data present in the transmit buffer, concurrently with at least one other apparatus transmitting uplink data, to the access point at a specified time based on receiving the CTX frame addressed to the apparatus when the transmit timer expires or when the uplink data present in the means for storing uplink data exceeds a threshold amount," "means for retransmitting the RTX frame," and/or "means for transmitting the polling response frame to the access point." Likewise, the receiver 212 may also be referred to as or may comprise at least a portion of "means for receiving a clear to transmit (CTX) frame from an access point based on the transmitted RTX frame," "means for receiving an acknowledge frame from the access point," and/or "means for receiving a polling request frame from the access point."

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 2B:
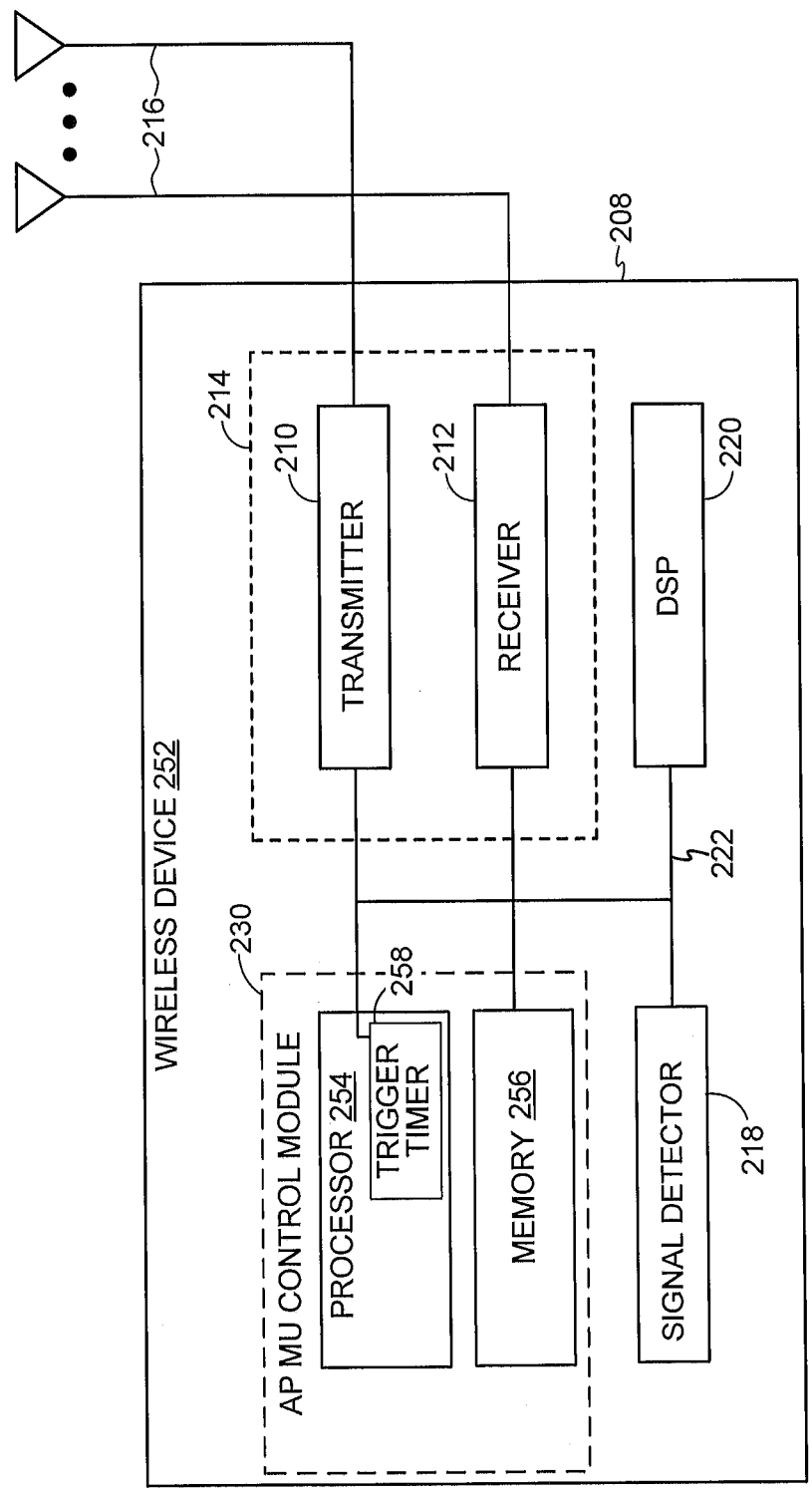
FIG. 2B illustrates various components that may be utilized in another wireless device that may be employed within the wireless communication system of FIG. 1.

FIG. 2B illustrates various components that may be utilized in another wireless device 252 that may be employed within the wireless communication system 100. The wireless device 252 is an example of a device that may be configured to implement the various methods described herein. The wireless device 252 may implement the AP 102.

The wireless device 252 may include the AT UL control module 230, which may include a processor 254 which controls operation of the wireless device 252. The processor 254 may also be referred to as a central processing unit (CPU). In some implementations, the AT UL control module 230 may additionally comprise memory 256, which may include both read-only memory (ROM) and random access memory (RAM), provides instructions and data to the processor 254. A portion of the memory 256 may also include non-volatile random access memory (NVRAM). The processor 254 may perform logical and arithmetic operations based on program instructions stored within the memory 256. The instructions in the memory 256 may be executable to implement the methods described herein. In some implementations, the processor 254 may comprise a trigger timer 258 having functionality as will be describe in more detail in connection with one or more figures below. The processor 254 may comprise or be a component of a processing system implemented with one or more processors.

The processing system may also include non-transitory, computer-readable media comprising code. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 252 may also include a housing 208 that may include a transmitter 210 and a receiver 212 to allow transmission and reception of data between the wireless device 252 and a remote location. The transmitter 210 and receiver 212 may be combined into a transceiver 214. A single or a plurality of transceiver antennas 216 may be attached to the housing 208 and electrically coupled to the transceiver 214. In some implementations, the transmitter 210 may also be referred to as or may comprise at least a portion of "means for transmitting a clear to transmit (CTX) message selectively addressed to one or more of a plurality of user terminals." Likewise, the receiver 212 may also be referred to as or may comprise at least a portion of "means for receiving an uplink data transmission from each of the plurality of user terminals at the specified time."

The wireless device 252 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 252 may also include a digital signal processor (DSP) 220 for use in processing signals.

The various components of the wireless device 252 may be coupled together by a bus system 222, which may include a power bus, a control signal bus, and a status signal bus in addition to a data bus.

Certain aspects of the present disclosure support transmitting an uplink (UL) signal from multiple user terminals to an AP. In some embodiments, the UL signal may be transmitted in a multi-user MIMO (MU-MIMO) system. Alternatively, the UL signal may be transmitted in a multi-user FDMA (MU-FDMA) or similar FDMA system. In these embodiments, UL-MU-MIMO or UL-FDMA transmissions can be transmitted simultaneously from multiple user terminals to an AP and may create efficiencies in wireless communication.

An increasing number of wireless and mobile devices put increasing stress on bandwidth requirements that are demanded for wireless communications systems. With limited communication resources, it is desirable to reduce the amount of control traffic passing between the AP and the multiple user terminals. For example, when Multiple terminals send uplink communications to the access point, it is desirable to minimize the amount of control overhead traffic to complete the all uplink transmissions. Thus, embodiments described herein support utilizing communication exchanges, scheduling and certain frames for increasing throughput of uplink transmissions to the AP.

The present application contemplates three operation modes based on whether an access point 102 (AP-initiated mode), a user terminal 104A-104D (STA-initiated mode) or a combination of the access point 102 and one or more user terminals 104A-104D (hybrid mode) initiates an uplink multiple user mode of communication.

Figure 3:
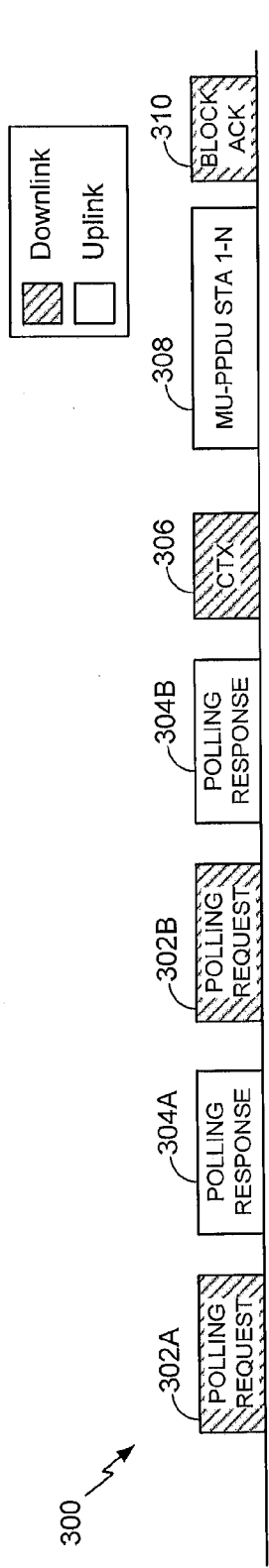
FIG. 3 shows a timing diagram of a frame exchange for an access point initiated uplink (UL) MU communication, in accordance with some implementations.

The AP-initiated mode will be discussed first with respect to FIG. 3. FIG. 3 shows a timing diagram 300 of a frame exchange for an access point initiated uplink (UL) MU communication, in accordance with some implementations. With respect to timing diagram 300, frames having a cross-hatch shading pattern may be downlink communications transmitted by an AP, for example the AP 102 of FIG. 1. Contrarily, frames having no shading pattern may be uplink communications transmitted by one or more of the user terminals user terminals 104A-104D. As shown in FIG. 3, the AP 102 may transmit polling request frames 302A, 302B to collect information from one or more respective user terminals 104A-104D regarding whether there are user terminals that have uplink data to transmit to the AP 102. The AP-initiated mode may be initiated by the AP 102 transmitting the polling request frames 302A, 302B.

In some implementations, the AP 102 may transmit the polling request frames 302A, 302B based on a periodic polling interval having a duration that is determined and/or selected by the AP 102. If the AP 102 selects a relatively short periodic polling interval, the user terminals 104A-104D may provide more up-to-date information at the expense of increase power utilization, since the user terminals 104A-104D must wake up to receive the periodic polling request frames more often. Contrarily, if the AP 102 selects a relatively long periodic polling interval, the user terminals 104A-104D may use less power, though providing less up-to-date information to the AP 102. The periodic polling interval may be a multiple of a beacon interval so that the user terminals 104A-104D wake up to receive polling request frames from the AP 102 only during particular beacon intervals. In some implementations, the AP 102 may determine a respective periodic polling interval for each of the user terminal 104A-104D, in which case, the periodic polling interval would be different for different user terminals. The AP 102 may notify each user terminal 104A-104D of the respective periodic polling interval via beacons or during association with a particular STA.

In some implementations, the AP 102 may transmit the polling request frames 302A, 302B based on a data traffic pattern for an application running on the respective user terminals 104A-104D, or based on a type of the application, rather than based on a determined periodic polling interval. For example, the AP 102 may determine such a data traffic pattern or type of application by receiving and analyzing piggybacked information or a traffic specification (TSPEC) from each of the user terminals 104A-104D. Additionally or alternatively the AP 102 may determine such a traffic pattern or type of application by correlating actual data traffic with known traffic patterns. The traffic patterns or type of application may be one of a new or pre-existing quality of service (QoS) types or access policies.

In some implementations the AP 102 may address the polling request frames 302A, 302B to more than one STA, e.g., a group of the user terminals 104A-104B. The AP 102 may assign particular user terminals into groups: randomly, based on a similar received signal strength indicator (RSSIs), based on a similar sleep cycle, based on a similar traffic pattern, or based on a similar buffer size. The AP 102 may alternatively group the user terminals 104A-104D by reserving one or more empty transmission streams for contention by unsolicited user terminals to respond.

In some implementations, rather than addressing a single polling request frame to a plurality of user terminals 104A-104D, the AP 102 may sequentially transmit separate polling request frames addressed to respective ones of the user terminals 104A-104D. Example frame formats for the polling request frames 302A, 302B are described in more detail in connection with FIGS. 6 and 7.

Each of the user terminals 104A-104D may transmit polling response frames 304A, 304B in response to receiving the polling request frames 302A, 302B addressed to that user terminal 104A-104D. In some implementations, each of the addressed user terminals 104A-104D may send respective polling response frames 304A, 304B substantially simultaneously on different frequency channels. In other implementations, each of the addressed user terminals 104A-104D may send respective polling response frames 304A, 304B sequentially on the same or different frequency channels. Each of the addressed user terminals 104A-104D may transmit the polling response frames 304A, 304B immediately upon receiving the polling request frames 302A, 302B, or alternatively, after contention-based access control initiated in response to receiving the polling request frames 302A, 304B. The polling response frames 304A, 304B may include information associated with the sending user terminal 104A-104D including but not limited to: an amount of data queued in a transmit buffer of the STA, an incoming or outgoing traffic rate of the STA, an acceptable or maximum wait time for sending the queued data, a mean, maximum and/or minimum size for a media access control service data unit (MSDU) of the STA, a requested transmit opportunity length determined by the STA, and a modulation and coding scheme (MCS) associate with the STA. Example frame formats for the polling response frames 304A, 304B are described in more detail in connection with FIG. 9.

The AP 102 may determine when to transmit a clear to transmit (CTX) frame 306 for triggering transmissions from the user terminals 104A-104D addressed in the polling request frames 302A, 302B based on receiving the polling response frames 304A, 304B from each of the addressed user terminals 104A-104D. The AP 102 may maintain a trigger timer (e.g., the trigger timer 258) for making this determination. The AP 102 may maintain a list of the user terminals 104A-104D that transmitted a polling response frame 304A, 304B and the associated information received in the polling response frames 304A, 304B. The AP 102 may initiate the trigger timer 258 for each user terminal 104A-104D that transmitted a polling response frame 304A, 304B to determine when to send the CTX frame 306 addressed to that particular STA. The timeout value of each trigger timer 258 may be based on the received information, application type, and/or data traffic pattern of the associated STA. The AP 102 may transmit the CTX frame 306 addressed to a particular user terminal 104A-104D based on expiration of the associated trigger timer.

Alternatively, the AP 102 may transmit the CTX frame 306 based on a transmission efficiency of the particular user terminal 104A-104D satisfying a predetermined, AP-adjustable threshold. The AP 102 may determine the transmission efficiency of the particular user terminal 104A-104D based, e.g., on a packing efficiency of data transmitted by that particular user terminal 104A-104D over a particular interval of time. In yet other implementations, the AP 102 may transmit the CTX frame 306 addressed to a particular user terminal 104A-104D based on contention-based access control.

Where more than one user terminal 104A-104D is addressed in the CTX frame 306, the AP 102 may selectively determine which user terminals 104A-104D to address in the CTX frame 306. The AP 102 may select any user terminal 104A-104D for which an associated trigger timer 258 has expired. The AP 102 may select any user terminal 104A-104D for which transmission efficiency satisfies the predetermined, AP-adjustable threshold. If multi-user UL transmission bandwidth is still available, the AP 102 may select one or more user terminals 104A-104D according to at least one of: a descending amount of data queued in the transmit buffers (e.g., greatest amounts selected first), ascending order of trigger timer 258 expiration (e.g., soonest expiration of trigger timers selected first), descending transmission efficiency (e.g., highest transmission efficiency selected first), random selection, or no additional selection at all. Thus, the AP 102 may be configured to selectively address the CTX frame 306 based on a trigger timer 258 expiring, a transmission efficiency of at least one of the plurality of user terminals 104A-104D exceeding a threshold, a decreasing order of time remaining on an unexpired trigger timer, a decreasing order of an amount of uplink data queued to be transmitted, or a decreasing order of transmission efficiency associated with the plurality of user terminals 104A-104D, or any combination thereof.

In response to receiving the CTX frame 306, each user terminal 104A-104D addressed in the CTX frame 306 may transmit its queued data to the AP 102 in a multi-user (MU) physical layer convergence procedure (PLCP) protocol data unit (MU-PPDU) 308. Accordingly, the MU-PPDU 308 may comprise data transmitted substantially simultaneously from each of the user terminal 104A-104D addressed in the CTX frame 306 to the AP 102. In response to receiving the MU-PPDU 308, the AP 102 may acknowledge the receipt of the MU-PPDU 308 by transmitting a block acknowledge (Block ACK) frame 310.

Figure 4:
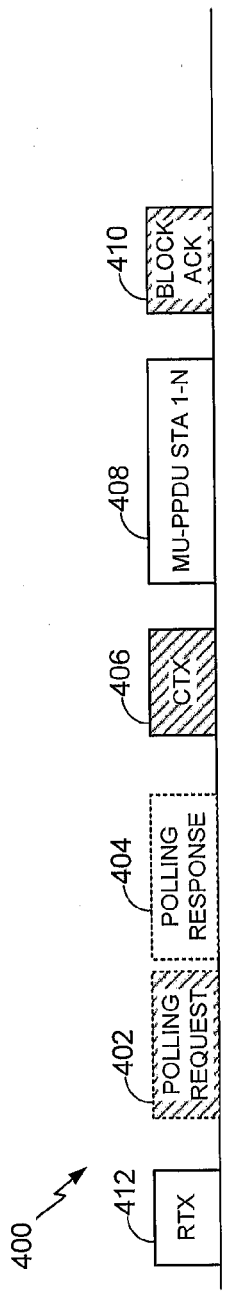
FIG. 4 shows a timing diagram of a frame exchange for a user terminal initiated uplink (UL) MU communication, in accordance with some implementations.

The user terminal 104A-104D (STA) initiated mode will now be discussed in connection with FIG. 4. FIG. 4 shows a timing diagram 400 of a frame exchange for a user-terminal-initiated uplink (UL) MU communication, in accordance with some implementations. One or more user terminals 104A-104D may initiate the UL mode by sending a request to transmit (RTX) frame 412 to the AP 102. Any of the user terminals 104A-104D may initiate a contention backoff timer for transmitting the RTX frame 412 based on any data being queued in its transmit buffer for transmission to the AP 102. A contention window length may be used during this contention backoff to avoid collisions on the transmission medium. The AP 102 may determine this contention window length and communicate it to each of the user terminals 104A-104D in beacons. In some implementations, any of the user terminals 104A-104D may initiate a transmit timer 227A-227D for transmitting the RTX frame 412 based on any non-zero amount of data being queued in its transmit buffer for transmission to the AP 102. The transmit timer 227A-227D counts down from a first value "X" and the user terminal 104A-104D initiates the contention backoff timer when the transmit timer 227A-227D expires or when an amount of data queued in its transmit buffer exceeds a predetermined threshold "Y". The values of "X" and "Y" may be a function of several variables including but not limited to: a number of user terminals in the same basic service set (BSS) and/or incoming traffic statistics from a particular STA. Alternatively, the user terminal 104A-104D for which the values of "X" and "Y" apply may determine the values of "X" and "Y." Alternatively, the AP 102 may determine and communicate the values of "X" and "Y" to the appropriate user terminal 104A-104D in a beacon or other management frame (e.g., in reserved bits of a TS info field). Thus, at least one of the timeout value (X) of the transmit timer 227A-227D and the threshold amount (Y) of the uplink data are configurable by one or both of the AP 102 or the user terminal (e.g., 104A-104D).

The user terminal 104A-104D may initiate a timeout timer 228A-228D for receiving a frame from the AP 102 in response to sending the RTX frame 412. The timeout timer, which is a timer for receiving a frame from the AP 102, is a different timer from the transmit timer, which is a timer for transmitting the RTX frame 412 to the AP 102 in the first place. If the user terminal 104A-104D that transmitted the RTX frame 412 does not receive a CTX frame or a polling request frame from the AP 102 before the timeout timer 228A-228D expires, the user terminal 104A-104D may retransmit the RTX frame 412. However, if the user terminal 104A-104D receives a polling request frame 402 before expiration of the timeout timer, the user terminal 104A-104D should reset the timeout timer 228A-228D and transmit a polling response frame 404 including the user terminal 104A-104D information previously described in connection with FIG. 3.

The AP 102 may optionally transmit the polling request frame 402 in response to receiving the RTX frame 412, as denoted by the dotted outline of the polling request frame 402. The polling request frame 402 may be the same as the polling request frames 302A, 302B previously described in connection with FIG. 3. The polling request frame 402 may also be utilized to obtain data traffic information from one or more user terminals other than the user terminal 104A-104D that transmitted the RTX frame 412. Any user terminal 104A-104D addressed by the polling request frame 402 may transmit a polling response frame 404 in response to receiving the polling request frame 402 from the AP 102. The polling response frame 404 may be the same as the polling response frames 304A, 304B previously described in connection with FIG. 3.

In response to receiving the polling response frame 404, the AP 102 may transmit a CTX frame 406 addressed to one or more of the user terminals 104A-104D. The user terminal 104A-104D that transmitted the RTX frame 412 is addressed by the CTX frame 406. The CTX frame 406 may additionally be addressed to one or more other user terminals, determined as previously described in connection with FIG. 3. The CTX frame 406 may be the same as the CTX frame 306 previously described in connection with FIG. 3. In some implementations where the polling request frame 402 and the polling response frame 404 are not transmitted, the AP 102 may transmit the CTX frame 406 directly in response to receiving the RTX frame 412. The AP 102 may transmit the CTX frame 406 directly in response to receiving a frame triggering its transmission or after contention-based access control. Any user terminal 104A-104D receiving the CTX frame 406, whether it's identifier is included in the CTX frame for triggering data transmission or not, may suspend its active timeout timer. If the received CTX frame 406 includes the identifier of the particular user terminal 104A-104D (e.g., the CTX frame 406 triggers that particular user terminal 104A-104D for UL transmission) that particular user terminal 104A-104D may cancel or clear its timeout timer 228A-228D and begin UL transmission by transmitting UL data to the AP 102 in the MU-PPDU 408, which may be substantially the same as the MU-PPDU 308 previously described in connection with FIG. 3. If the received CTX frame 406 does not include the identifier of the particular user terminal 104A-104D (e.g., the CTX frame 406 does not trigger that particular user terminal 104A-104D for UL transmission) that particular user terminal 104A-104D may start a new transmit timer 227A-227D for the next RTX transmission.

If a particular user terminal 104A-104D is already backing off in preparation for retransmitting the RTX frame 412 (due to expiration of a previous timeout timer) and receives the CTX frame 406 addressed to that particular user terminal 104A-104D (e.g., the CTX frame 406 triggers that particular STA), that particular user terminal 104A-104D may reset or clear its RTX backoff timer and begin transmitting the UL data to the AP 102 in the MU-PPDU 408.

If the received CTX frame 406 includes the identifier of the particular STA, that particular user terminal 104A-104D may reset its timeout timer 228A-228D and begin UL transmission by transmitting the UL data to the AP 102 in the MU-PPDU 408. If the received CTX frame 406 does not include the identifier of the particular STA, that particular user terminal 104A-104D may set and begin a new transmit timer 227A-227D for a next RTX frame transmission.

After the MU-PPDU 408 is received by the AP 102, the AP 102 may transmit a block ACK frame 410 acknowledging the receipt of the MU-PPDU 408. The block ACK frame 410 may be the same as the block ACK frame 310 previously described in connection with FIG. 3.

After the UL data session (e.g., after the AP 102 transmits the block ACK frame 410) if there is still UL data for transmission from a particular user terminal 104A-104D (e.g., an amount of queued data in a transmit buffer is still greater than zero), that particular user terminal 104A-104D may initiate a new transmit timer. Alternatively, if after the UL data session there is no UL data for transmission, that particular user terminal 104A-104D may reset both its transmit timer 227A-227D and its timeout timer 228A-228D if they are active.

Figure 5:
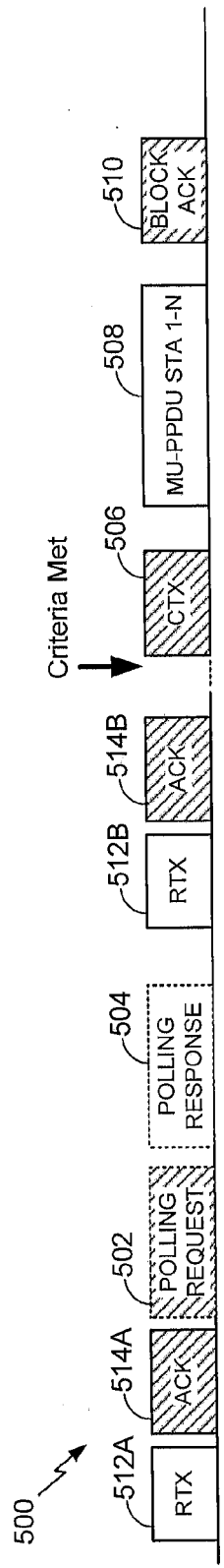
FIG. 5 shows a timing diagram of a frame exchange for a hybrid access point-user terminal initiated uplink (UL) MU communication, in accordance with some implementations.

The hybrid access point 102 (AP) and user terminal 104A-104D (STA) mode will now be discussed with respect to FIG. 5. FIG. 5 shows a timing diagram 500 of a frame exchange for a hybrid access point-user terminal uplink (UL) MU communication, in accordance with some implementations. As shown in FIG. 5, one of the user terminals 104A-104D may transmit an RTX frame 512A, 512B, as previously described for the RTX frame 412 of FIG. 4. After transmitting the RTX frame 512A, 512B, the transmitting user terminal 104A-104D may initiate a timeout timer, as previously described in connection with FIG. 4. If the timeout timer 228A-228D expires before receiving either an acknowledge frame 514A, 514B or a CTX frame 506 from the AP 102, the user terminal 104A-104D may retransmit the RTX frame 512A, 512B.

However, in contrast to FIG. 4, upon receiving the RTX frame 512A, 512B, the AP 102 may transmit an acknowledge (ACK) frame 514A, 514B to the user terminal 104A-104D that transmitted the RTX frame 512A, 512B. In some implementations, the AP 102 may insert new values for the timeout timer 228A-228D (e.g., "X" values) and for the predetermined buffer threshold (e.g., the "Y" values) in the ACK frame 514A, 514B. The user terminal 104A-104D to which the ACK frame 514A, 514B is addressed may update its "X" and "Y" values accordingly. In some implementations, the user terminals 104A-104D to which the ACK frame 514A, 514B was not addressed may also update their "X" and "Y" values accordingly. In implementations where the ACK frame 514A, 514B does not include new values for "X" and "Y," the user terminal 104A-104D to which the ACK frame 514A, 514B is addressed may update its "X" and "Y" values based on information known to that STA. Likewise, in some implementations where the ACK frame 514A, 514B does not include the new values for "X" and "Y," the user terminals to which the ACK frame 514A, 514B was not addressed may also update (e.g., lower) their "X" and "Y" values according to information known to those user terminals. Upon receiving the ACK frame 514A, 514B, the receiving user terminal 104A-104D may reset the timeout timer 228A-228D if it is active. The user terminal 104A-104D may also initiate a new transmit timer 227A-227D for a next RTX frame transmission.

In some implementations, the AP 102 may optionally (as denoted by the dotted outline) transmit a polling request frame 502 to receive additional information from the RTX-transmitting user terminal 104A-104D and/or from other user terminals in the BSS. The polling request frame 502 may be the same as the polling request frames 302A, 302B, 402 previously described in connection with FIGS. 3 and 4. In some implementations, the polling request frame 502 may be combined with the ACK frame 514A into a single transmitted frame that both acknowledges receipt of the RTX frame 512A and requests additional information from one or more user terminals 104A-104D. If the polling request frame 502 is received by the user terminal 104A-104D before the timeout timer 228A-228D expires, the user terminal 104A-104D may reset or clear the timeout timer 228A-228D and transmit a polling response frame 504 including the user terminal 104A-104D information, as previously described in connection with FIG. 3. The polling response frame 504 may be the same as the polling response frames 304A, 304B, 404 previously described in connection with FIGS. 3 and 4.

In some implementations, no ACK frame 514A, 514B, polling request frame 502 or polling response frame 504 may be transmitted and the AP 102 may transmit a CTX frame 506 addressed to the user terminal 104A-104D that send the RTX frame 512A, 512B immediately after and directly in response to receiving the RTX frame 512A, 512B if the transmission efficiency of the sending user terminal 104A-104D is greater than the predetermined, AP-adjustable value previously described in connection with FIG. 3.

In yet other implementations, the AP 102 may transmit the ACK frame 514A, 514B in response to receiving the RTX frame 512A, 512B and then initiate the trigger timer 258 associated with the user terminal 104A-104D that transmitted the RTX frame 512A, 512B for determining when to transmit the CTX frame 506, as previously described in connection with FIG. 3. The AP 102 may optionally shorten or reduce the initial count down value for the trigger timer 258 associated with a particular user terminal 104A-104D that has transmitted multiple RTX frames but has not yet transmitted any UL data to the AP 102. Accordingly, depending on the implementation, the AP 102 may be configured to transmit the CTX frame 506 as soon as any trigger timer 258 associated with any user terminal 104A-104D has expired, as soon as the transmit efficiency of any user terminal 104A-104D is greater than the predetermined, AP-adjustable value, or after contention-based access control triggered by the existence of either of the two immediately-above conditions. Where contention-based access control is utilized, contention parameters may be different for the CTX frames 506 than for other frames to ensure higher contention priority for CTX frames 506 as compared to the other frames. For example, where both a CTX frame 506 and any other type of frame (e.g., a polling request frame) would be scheduled for transmission at the same time, the AP 102 may schedule the CTX frame 506 for transmission before the other frame (e.g., the polling request frame 502). Where the CTX frame 506 is not transmitted immediately after receipt of the RTX frame 512A, 512B, the AP 102 may provide a selected list of user terminals 104A-104D to be scheduled in the CTX frame 506 (e.g., their identifiers are to be included in the CTX frame 506), as previously described in connection with FIG. 3. After transmission of the CTX frame 506, the behavior of the user terminals 104A-104D and the AP 102 may be the same as previously described in connection with FIG. 4, including transmission of UL data via the MU-PPDU frame 508 by any user terminals 104A-104D that were addressed in the CTX frame 506. The AP 102 may then transmit a block ACK frame 510 to acknowledge the accurate receipt of the MU-PPDU frame 508.

Figure 6:
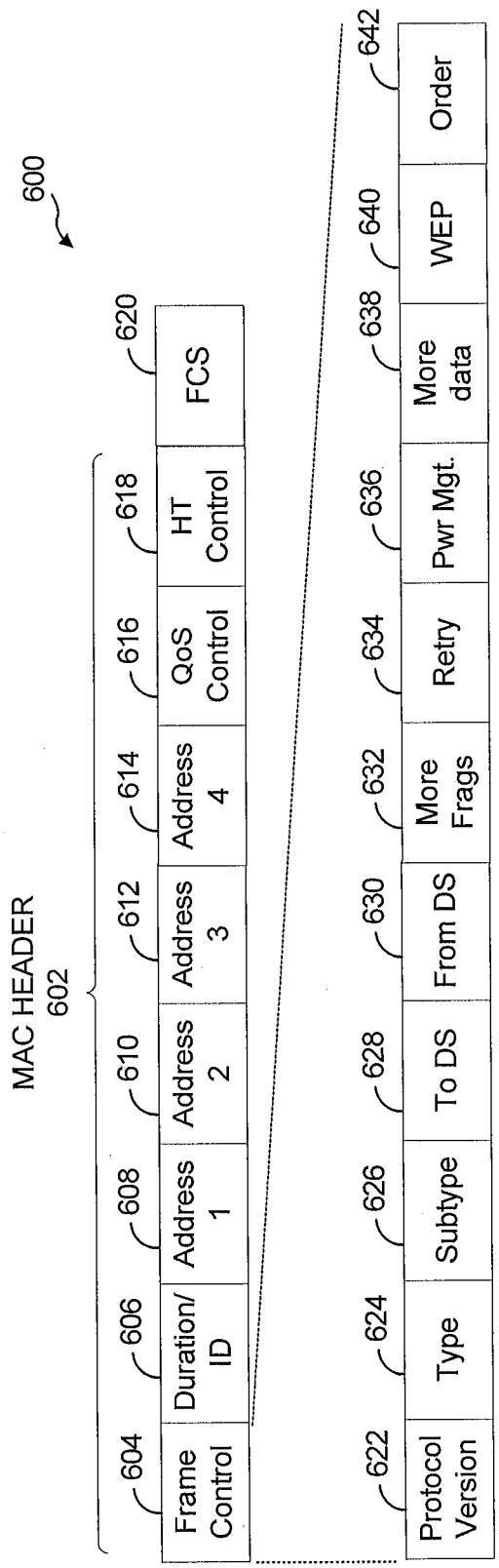
FIG. 6 illustrates a polling request frame having a modified null data frame format, in accordance with some implementations.

FIG. 6 illustrates a polling request frame 600 having a modified null data frame format, in accordance with some implementations. The polling request frames 302A, 302B, 402, 502 of FIGS. 3, 4, and 5 may have a modified null data frame (e.g., a null data packet) format, such as that shown in FIG. 6. The polling request frame 600 may include a MAC header 602 including one or more of the following 8 fields: a frame control (fc) field 604, a duration field 606, a receiver address (a1) field 608, a transmitter address (a2) field 610, a destination address (a3) field 612, a fourth address (a4) field 614, a quality of service (QoS) control field 616, and a High Throughput (HT) control field 618. The null data frame 600 may additionally include a frame check sequence (FCS) field 620. Each of the a1, a2, a3, and a4 fields 608, 610, 612 and 614 may comprise a full MAC address of a device, which is a 68-bit (6 octet) value, or alternatively, any of these fields may comprise an associated identification (AID) based on a short MAC header format. With respect to the timing diagrams described in FIGS. 1 and 3-5, the AP 102 of FIG. 1, may be configured to include either a group identifier corresponding to all user terminals 104A-104D for which polling data is requested (e.g., any of the user terminals 104A-104D of FIG. 1) in either the receiver address (a1) field 608 or the destination address (a3) field 612. Alternatively, the AP 102 may be configured to include a separate MAC address for each of the user terminals 104A-104D for which polling data is requested by the polling request frame 600 in either of fields 608 and 612. The MAC address of the AP 102 may be included in the transmitter address (a2) field 610.

In addition, each of the above-described fields may comprise one or more subfields. For example, as shown in FIG. 6, the frame control field 604 may comprise one or more of the following subfields: a protocol version subfield 622, a type subfield 624, a subtype subfield 626, a to distributed system (DS) subfield 628, a from DS subfield 630, a more fragments subfield 632, a retry subfield 634, a power management subfield 636, a more data indication subfield 638, a WEP subfield 640 and an order subfield 642. In some implementations, the AP 102 may be configured to insert a new indication identifying the frame 600 as a polling request frame into the type subfield 624 and/or the subtype subfield 626. In this way, any compatible receiving user terminal 104A-104D may be configured to correctly identify the frame 600 as a polling request frame, as previously described in connection with FIGS. 3-5.

Figure 7:
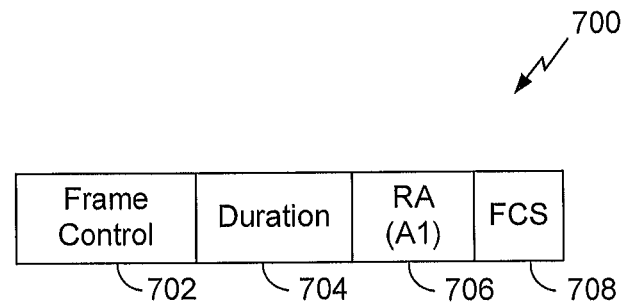
FIG. 7 illustrates a polling request frame having a modified clear to transmit (CTX) frame format, in accordance with some implementations.

In some other implementations the polling request frames 302A, 302B, 402, 502 of FIGS. 3-5 may have the format of a modified CTX frame. FIG. 7 illustrates a polling request frame 700 having a modified clear to transmit (CTX) frame format. The polling request frame 700 may include one or more of the following 4 fields: a frame control (FC) field 702, a duration field 704, a receiver address (RA) field 706 (also referred to as a receiver address (a1)), and a frame check sequence (FCS) field 708. The frame control field 702 may be substantially the same as the frame control field 604 previously described in connection with FIG. 6 and may include substantially the same information. The duration field 704 may be substantially the same as the duration field 606 previously described in connection with FIG. 6 and may include substantially the same information. The RA field 706 may be substantially the same as the address 1 field 608 as previously described in connection with FIG. 6 and includes substantially the same information. Finally, the FCS field 708 may be substantially the same as the FCS field 620 as previously described in connection with FIG. 6 and may include substantially the same information. Although exemplary implementations of the polling request frames 302A, 302B, 402, 502 have been described in FIGS. 6 and 7, the present application is not so limited and the polling request frames 302A, 302B, 402, 502 may comprise any other new frame type or configuration.

In addition, the CTX frames 306, 406, 506 may have substantially the same format as the polling request frame 700 with the exception that an indication in the type subfield and/or the subtype subfield within the frame control field 702 may indicate a CTX frame rather than a polling request frame.

Figure 8:
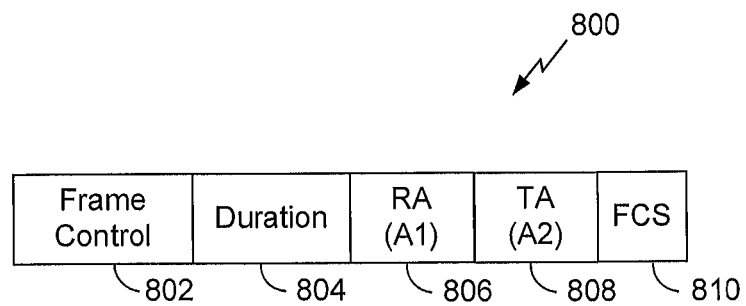
FIG. 8 illustrates a request to transmit (RTX) frame, in accordance with some implementations.

FIG. 8 illustrates a request to transmit (RTX) frame, in accordance with some implementations. The RTX frame 800 may include one or more of the following 5 fields: a frame control (FC) field 802, a duration field 804, a receiver address (RA) field 806 (also referred to as a receiver address (a1)), a transmitter address (TA) field 808 (also referred to as a transmitter address (a2)), and a frame check sequence (FCS) field 810. The frame control field 802, duration field 804, RA field 806, TA field 808 and FCS field 810 may be substantially the same and include substantially the same information as the frame control field 604, duration field 606, address 1 field 608, address 2 field 610, and FCS field 620, respectively, as previously described in connection with FIG. 6.

Figure 9:
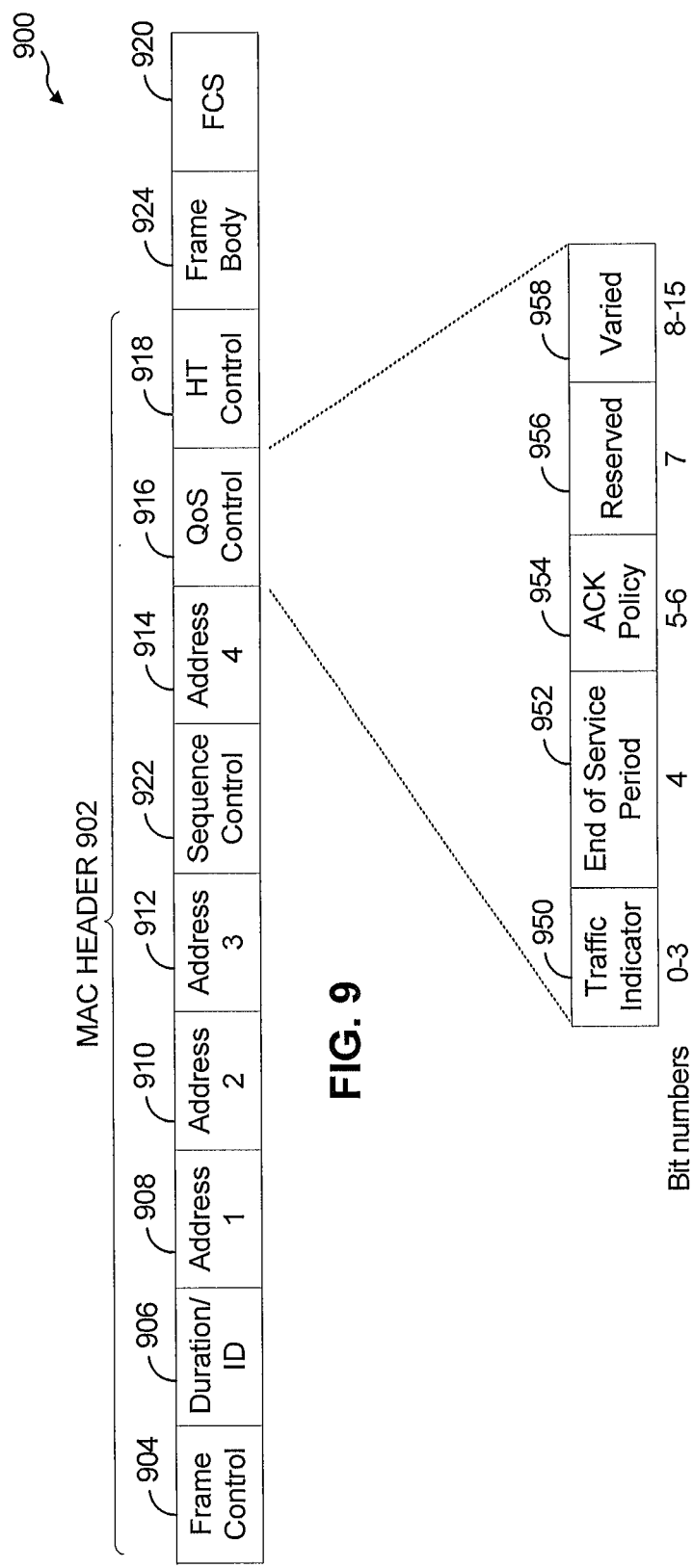
FIG. 9 illustrates a polling response frame having a modified quality of service (QoS) frame format, in accordance with some implementations.

FIG. 9 illustrates a polling response frame 900 having a modified quality of service (QoS) frame format, in accordance with some implementations. In some implementations, the polling response frames 304A, 304B, 404, 504 of FIGS. 3, 4, and 5 may have the modified QoS frame format shown in FIG. 9. The polling response frame 900 may include a MAC header 902 including one or more of the following 9 fields: a frame control (fc) field 904, a duration field 906, a receiver address (a1) field 908, a transmitter address (a2) field 910, a destination address (a3) field 912, a sequence control field 922, a fourth address (a4) field 914, a quality of service (QoS) control field 916, and a High Throughput (HT) control field 918. Where the polling response frame 900 is not a null frame, the polling response frame 900 may additionally include a frame body field 924, which may include a data payload. The polling response frame 900 additionally includes a frame check sequence (FCS) field 920 for error checking purposes. Each of the frame control field 904, duration field 906, address 1 field 908, address 2 field 910, address 3 field 912, address field 914, HT control field 918 and FCS field 920 may be substantially the same and include substantially the same information as the frame control field 604, duration field 606, address 1 field 608, address 2 field 610, address 3 field 612, address field 614, HT control field 618 and FCS field 620, respectively, as previously described in connection with FIG. 6. For example, in some implementations, an user terminal 104A-104D receiving a polling request frame may be configured to insert into the type subfield and/or the subtype field (see FIG. 6) of the frame control field 904 a new indication corresponding to a polling response frame. In this way, the AP 102 may be able to accurately identify the frame 900 as a polling response frame, as previously described in connection with FIGS. 3-5.

In addition, as shown in FIG. 9, the QoS control field 916 may comprise one or more of the following subfields: a traffic indicator subfield 950, an end of service period subfield 952, an acknowledge policy subfield 954, a reserved subfield 956 and a varied subfield 958. In some implementations, the above-mentioned subfields may have lengths of 4, 1, 2, 1, and 8 bits, respectively. As previously described in connection with FIGS. 3-5, in response to receiving a polling request frame, one or more user terminals 104A-104D to which the polling request frame was addressed may transmit a polling response frame including information corresponding to the sending user terminal 104A-104D such as: a length of data queued to be transmitted to the AP 102, the user terminal's incoming traffic rate, the user terminals 104A-104D acceptable wait time for sending queued data, the user terminal's MSDU mean, maximum and minimum sizes, the user terminal's desired TXOP length, and the user terminal's MCS.

The present application contemplates reusing one or more fields or subfields of the polling response frame 900 (e.g., the modified QoS frame) to transmit such information to the AP 102. For example, the length of data queued to be transmitted to the AP 102 may be piggybacked in one or more of bits 8-15 of the QoS control field 916 (e.g., in the varied subfield 958) of a last transmitted QoS data frame having the format of the polling response frame 900. In some implementations, the additional uplink information (e.g., the user terminal's incoming traffic rate, the user terminals acceptable wait time for sending queued data, the user terminal's MSDU mean, maximum and minimum sizes, the user terminal's desired TXOP length, and the user terminal's MCS) may be included in the polling response frame 900 by reusing one or more of the subfields of the QoS control field 916. For example, bits 8 and 9 or 8-10 of the varied subfield 958 may be reused to indicate a type of information (e.g., the user terminal's incoming traffic rate, the user terminals acceptable wait time for sending queued data, the user terminal's MSDU mean, maximum and minimum sizes, the user terminal's desired TXOP length, and the user terminal's MCS), while bits 10-15 or 11-15 may be reused to indicate the value(s) corresponding to the info type indicated in bits 8 and 9 or 8-10, respectively. In addition or in the alternative, where the polling response frame 900 has the format of a QoS null frame, the sequence control field 922 would not conventionally be utilized, since the frame body field 924 would not include any data for which a sequence would be needed. In such a situation, the present application contemplates reusing the sequence control field 924 to transmit the uplink data to the AP 102. For example, at least a portion of the previously described additional uplink information may be inserted in the sequence control field 922 when the polling response frame 900 has the format of a QoS null frame. Accordingly, any of the user terminals 104A-104D of FIG. 1 may be configured to insert uplink information as described above and transmit the polling response frame 900 to the AP 102. In this way, the AP 102 may be able to obtain desired uplink information from the one or more user terminals 104A-104D, as previously described in connection with FIGS. 3-5.

Although exemplary implementations of the polling response frames 304A, 304B, 404, 504 have been described with respect to FIG. 9, the present application is not so limited and the polling response frames 304A, 304B, 404, 504 may comprise any other new frame type or configuration.

Figure 10:
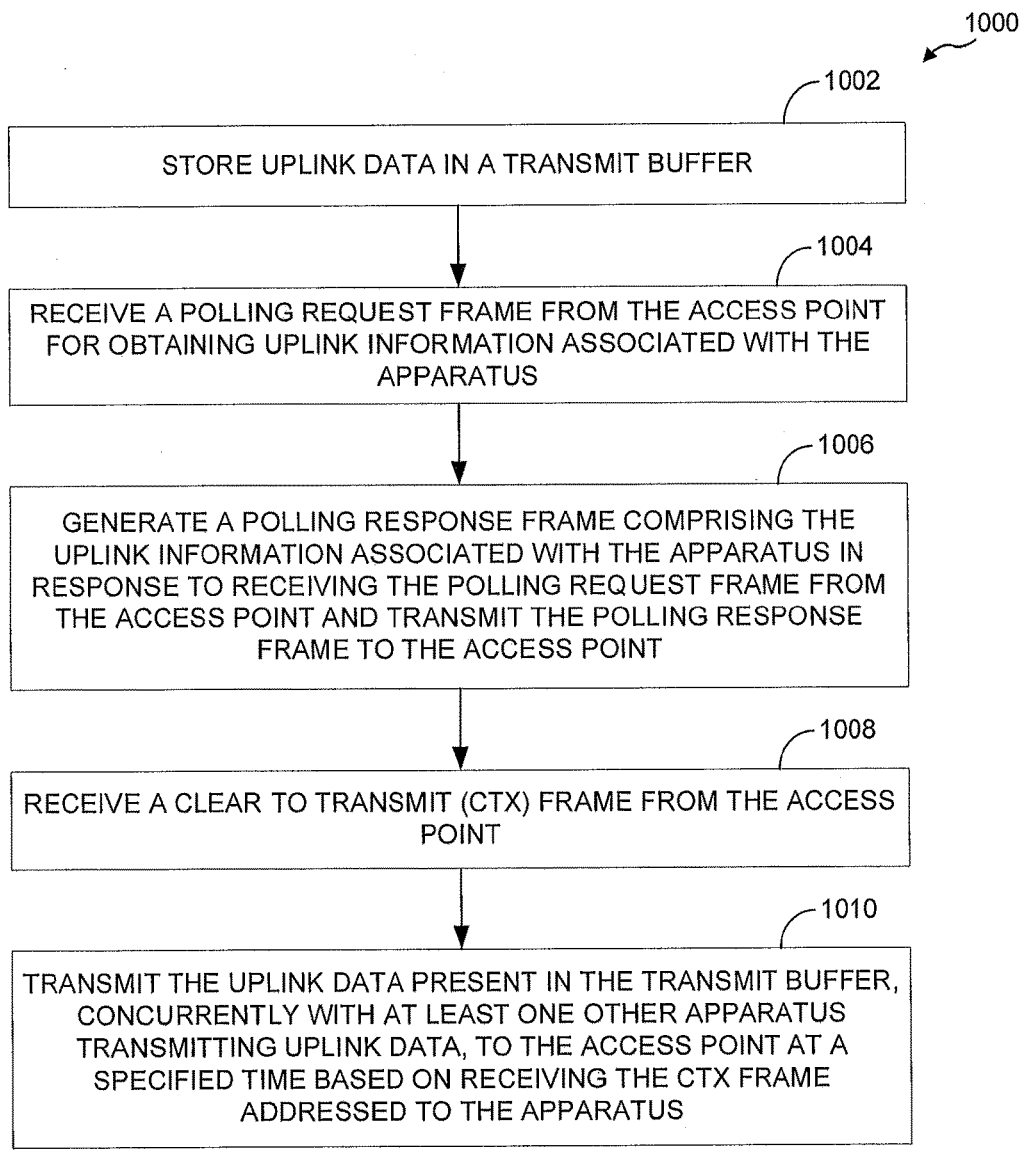
FIG. 10 is a flow chart illustrating a method for multiple-user wireless communication by a user terminal in an access point initiated mode, in accordance with some implementations.

FIG. 10 is a flow chart 1000 illustrating a method for multiple-user wireless communication by a user terminal (e.g., any of the user terminals 104A-104D of FIG. 1) in an access point initiated mode, in accordance with some implementations, as previously described in connection with FIG. 3. In some implementations, as previously stated, the user terminals 104A-104D may be implemented by the wireless device 202 of FIG. 2A. Accordingly, one or more of the steps in flowchart 1000 may be performed by, or in connection with, the UT MU control module 230 (e.g., one or more of the processor 204, which may comprise the transmit timer 227A-227D and the timeout timer 228A-228D, and the memory 206, which may comprise the transmit buffer 226A-226D) and/or the transmitter 210 or receiver 212 as previously described in connection with FIG. 2. However, those having ordinary skill in the art will appreciate that other components may be used to implement one or more of the steps described herein. Although blocks may be described as occurring in a certain order, the blocks can be reordered, blocks can be omitted, and/or additional blocks can be added.

The flowchart 1000 may begin with block 1002, which includes storing uplink data in a transmit buffer. For example, the wireless device 202 of FIG. 2A may be configured to store uplink data in the transmit buffer 226A-226D for transmission to the AP 102 of FIG. 1. The flowchart 1000 may then proceed to block 1004.

Block 1004 includes receiving a polling request frame from the access point for obtaining uplink information associated with the apparatus. For example, the receiver 212 of the wireless device 202 (FIG. 2A) may be configured to receive the polling request frame 302A, 302B as previously described in connection with FIG. 3. The flowchart 1000 may then proceed to block 1006.

Block 1006 includes generating a polling response frame comprising the uplink information associated with the user terminal in response to receiving the polling request frame from the access point and transmitting the polling response frame to the access point. For example, the processor 204 of the wireless device 202 (FIG. 2) may be configured to generate the polling response frame 304A, 304B as previously described in connection with FIG. 3. The flowchart 1000 may then proceed to block 1008.

Block 1008 includes receiving a clear to transmit (CTX) frame from an access point. For example, the receiver 212 of the wireless device 202 (FIG. 2A) may be configured to receive the CTX frame 306 from the access point 102 (FIG. 1) as previously described in connection with FIG. 3. The flowchart 1000 may then proceed to block 1010.

Block 1010 includes transmitting the uplink data present in the transmit buffer, concurrently with at least one other user terminal transmitting uplink data, to the access point at a specified time based on receiving the CTX frame addressed to the user terminal. For example, the transmitter 210 of the wireless device 202 (FIG. 2) may be configured to transmit the uplink data present in the transmit buffer 226A-226D, concurrently with at least one other of the user terminals 104A-104D (FIG. 1) transmitting uplink data, to the access point 102 (FIG. 1) at a specified time based on receiving the CTX frame 306, as previously described in connection with FIG. 3.

Figure 11:
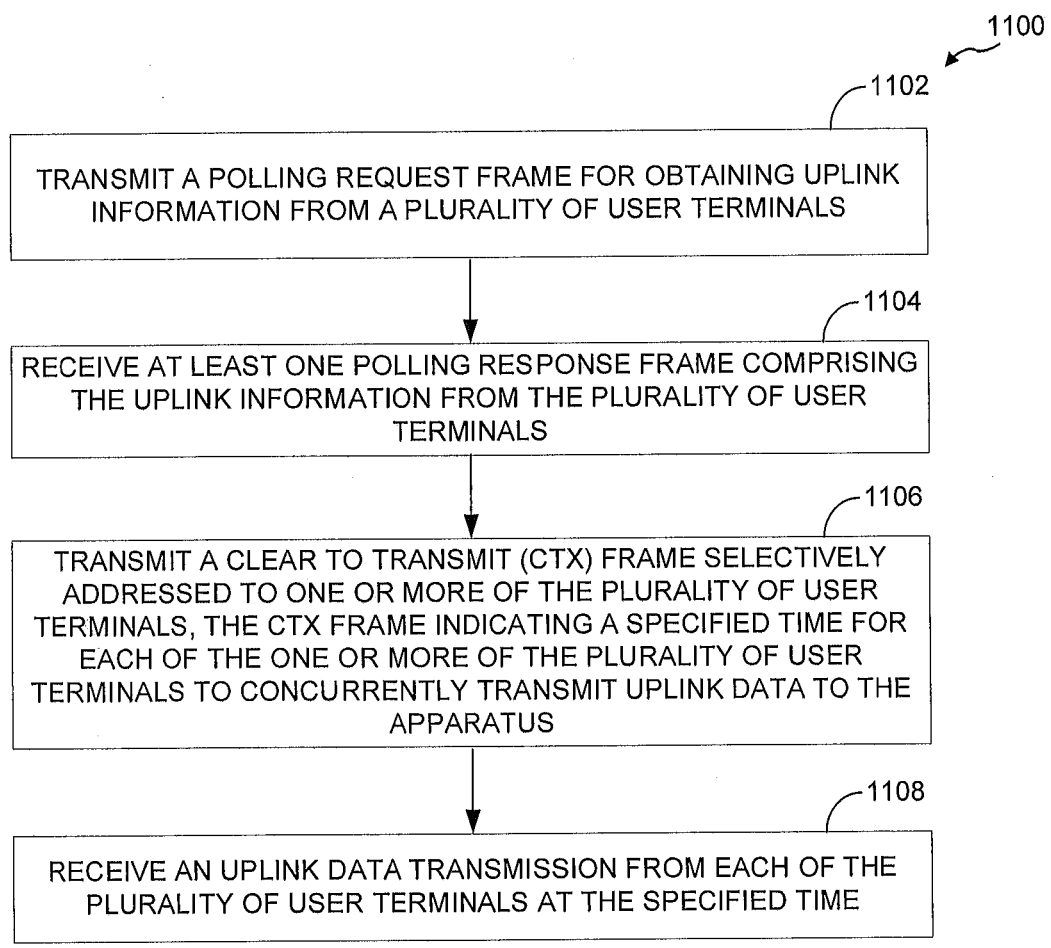
FIG. 11 is a flow chart illustrating a method for multiple-user wireless communication by an access point in an access point initiated mode, in accordance with some implementations.

FIG. 11 is a flow chart 1100 illustrating a method for multiple-user wireless communication by an access point (e.g., the AP 102 of FIG. 1) in an access point initiated mode, in accordance with some implementations, as previously described in connection with FIG. 3. In some implementations, as previously stated, the AP 102 may be implemented by the wireless device 252 of FIG. 2B. Accordingly, one or more of the steps in flowchart 1100 may be performed by, or in connection with, the AP MU control module 230 (e.g., one or both of the processor 254, which may include the trigger timer 258, and the memory 256) and/or the transmitter 211 or receiver 212 as previously described in connection with FIG. 2B. However, those having ordinary skill in the art will appreciate that other components may be used to implement one or more of the steps described herein. Although blocks may be described as occurring in a certain order, the blocks can be reordered, blocks can be omitted, and/or additional blocks can be added.

The flowchart 1100 may begin with block 1102, which includes transmitting a polling request frame for obtaining uplink information from a plurality of user terminals. For example, the transmitter 210 of the wireless device 252 (FIG. 2B) may be configured to transmit the polling request frame 302A, 302B for obtaining uplink information from the user terminals 104A-104D (FIG. 1), as previously described in connection with FIG. 3. The flowchart 1100 may then proceed to block 1104.

Block 1104 includes receiving at least one polling response frame comprising the uplink information from the plurality of user terminals. For example, the receiver 212 of the wireless device 252 (FIG. 2B) may be configured to receive the polling response frame 304A, 304B as previously described in connection with FIG. 3. The flowchart 1100 may then proceed to block 1106.

Block 1106 includes transmitting a clear to transmit (CTX) frame selectively addressed to one or more of the plurality of user terminals, the CTX frame indicating a specified time for each of the one or more of the plurality of user terminals to concurrently transmit uplink data to the apparatus. For example, the transmitter 210 of the wireless device 252 (FIG. 2B) may be configured to transmit the CTX frame 306 as previously described in connection with FIG. 3. The term "selectively addressed to the plurality of user terminals" may indicate that less than all of the user terminals that originally transmit a polling response frame 304A, 304B are addressed in the CTX frame 306. The flowchart 1100 may then proceed to block 1108.

Block 1108 includes receiving an uplink data transmission from each of the plurality of user terminals at the specified time. For example, the receiver 212 of the wireless device 252 (FIG. 2B) may be configured to receive the MU-PPDU 308, which may include uplink data from more than one of the user terminals 104A-104D (FIG. 1) as previously described in connection with FIG. 3.

Figure 12:
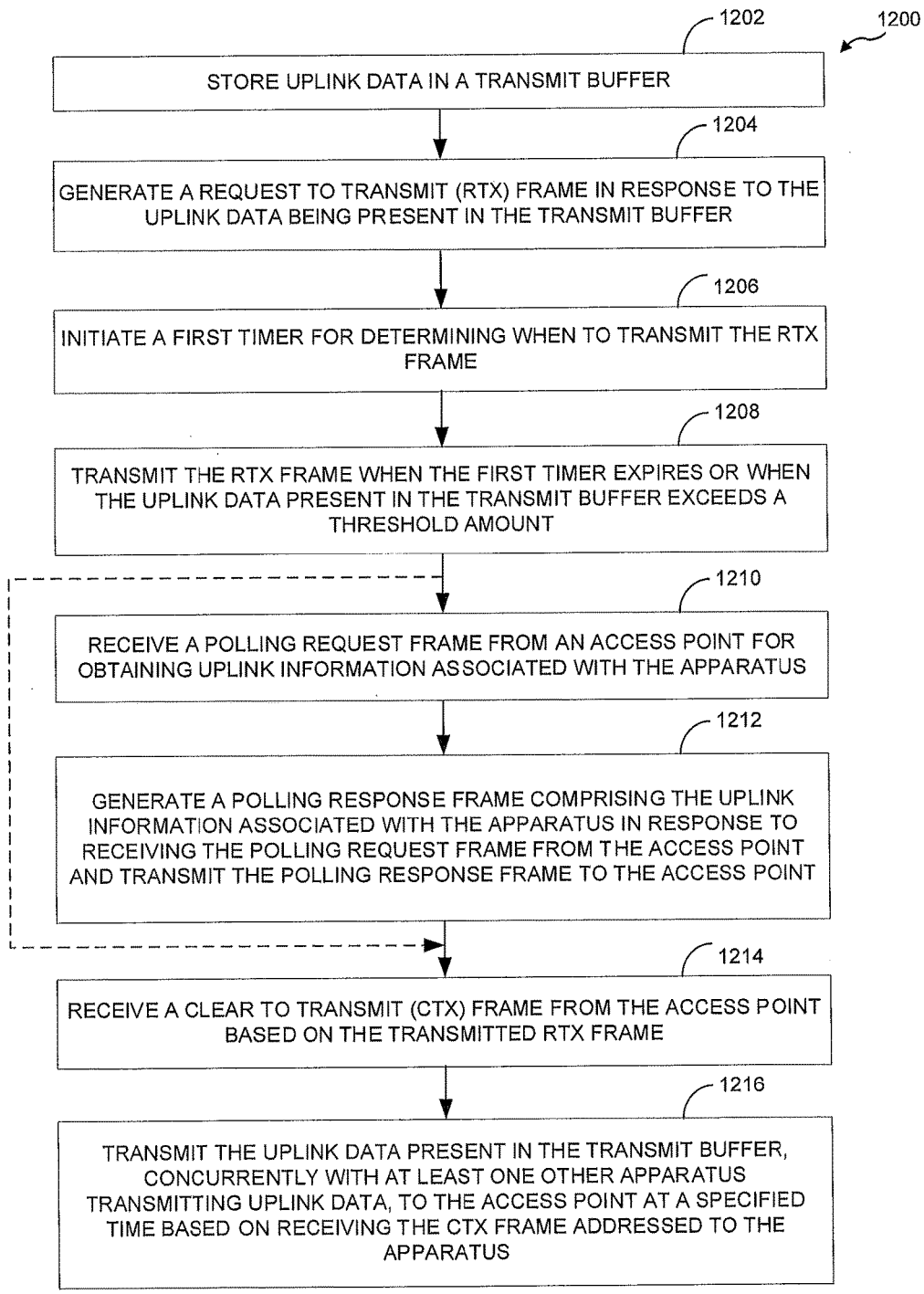
FIG. 12 is a flow chart illustrating another method for multiple-user wireless communication by a user terminal in a user terminal initiated mode, in accordance with some implementations.

FIG. 12 is a flow chart 1200 illustrating another method for multiple-user wireless communication by a user terminal (e.g., any of the user terminals 104A-104D of FIG. 1) in a user terminal initiated mode, in accordance with some implementations, as previously described in connection with FIG. 4. In some implementations, as previously stated, the user terminals 104A-104D may be implemented by the wireless device 202 of FIG. 2A. Accordingly, one or more of the steps in flowchart 1000 may be performed by, or in connection with, the UT MU control module 230 (e.g., one or more of the processor 204, which may comprise the transmit timer 227A-227D and the timeout timer 228A-228D, and the memory 206, which may comprise the transmit buffer 226A-226D) and/or the transmitter 210 or receiver 212 as previously described in connection with FIG. 2. However, those having ordinary skill in the art will appreciate that other components may be used to implement one or more of the steps described herein. Although blocks may be described as occurring in a certain order, the blocks can be reordered, blocks can be omitted, and/or additional blocks can be added.

The flowchart 1200 may begin with block 1202, which includes storing uplink data in a transmit buffer. For example, the wireless device 202 of FIG. 2A may be configured to store uplink data in the transmit buffer 226A-226D for transmission to the AP 102 of FIG. 1. The flowchart 1200 may then proceed to block 1204.

Block 1204 includes generating a request to transmit (RTX) frame in response to the uplink data being present in the transmit buffer. For example, the processor 204 of the wireless device 202 (FIG. 2A) may be configured to generate the RTX frame 412 as previously described in connection with FIG. 4. The flowchart 1200 may then proceed to block 1206.

Block 1206 includes initiating a transmit timer for determining when to transmit the RTX frame. For example, the processor 204 of the wireless device 202 (FIG. 2A) may be configured to initiate the transmit timer 227A-227D as previously described in connection with FIG. 4. The flowchart 1200 may then proceed to block 1208.

Block 1208 includes transmitting the RTX frame when the transmit timer expires or when the uplink data present in the transmit buffer exceeds a threshold amount. For example, the transmitter 210 of the wireless device 202 (FIG. 2A) may be configured to transmit the RTX frame 412 when either the transmit timer 227A-227D counts down from "X" to zero, or when the uplink data in the transmission buffer exceeds the predetermined trigger level "Y" as previously described in connection with FIG. 4. The flowchart 1200 may then proceed to block 1212.

In some implementations, the AP 102 may transmit a polling request upon receiving the RTX frame 412. In such implementations, the flowchart. 1200 may proceed to block 1210. Otherwise, the flowchart 1200 may proceed directly to block 1214, skipping blocks 1210 and 1212, as shown by the dotted arrow. Block 1210 may comprise receiving a polling request frame from an access point for obtaining uplink information associated with the apparatus. For example, the receiver 212 of the wireless device 202 (FIG. 2A) may be configured to receive the polling request frame 402 as previously described in connection with FIG. 4. The flowchart 1200 may then proceed to block 1212.

Block 1212 includes generating a polling response frame comprising the uplink information associated with the apparatus in response to receiving the polling request frame from the access point and transmitting the polling response frame to the access point. For example, the processor 204 of the wireless device 202 (FIG. 2A) may be configured to generate the polling response frame 404 as previously described in connection with FIG. 4. The flowchart 1200 may then proceed to block 1214.

Block 1214 includes receiving a clear to transmit (CTX) frame from the access point. For example, the receiver 212 of the wireless device 202 (FIG. 2A) may be configured to receive the CTX frame 406 from the access point 102 (FIG. 1) as previously described in connection with FIG. 4. The flowchart 1200 may then proceed to block 1216.

Block 1216 includes transmitting the uplink data present in the transmit buffer, concurrently with at least one other apparatus transmitting uplink data, to the access point at a specified time based on receiving the CTX frame addressed to the apparatus. For example, the transmitter 210 of the wireless device 202 (FIG. 2A) may be configured to transmit the uplink data present in the memory 206, concurrently with at least one other of the user terminals 104A-104D (FIG. 1) transmitting uplink data, to the access point 102 (FIG. 1) at a specified time based on receiving the CTX frame 406 as previously described in connection with FIG. 4.

Figure 13:
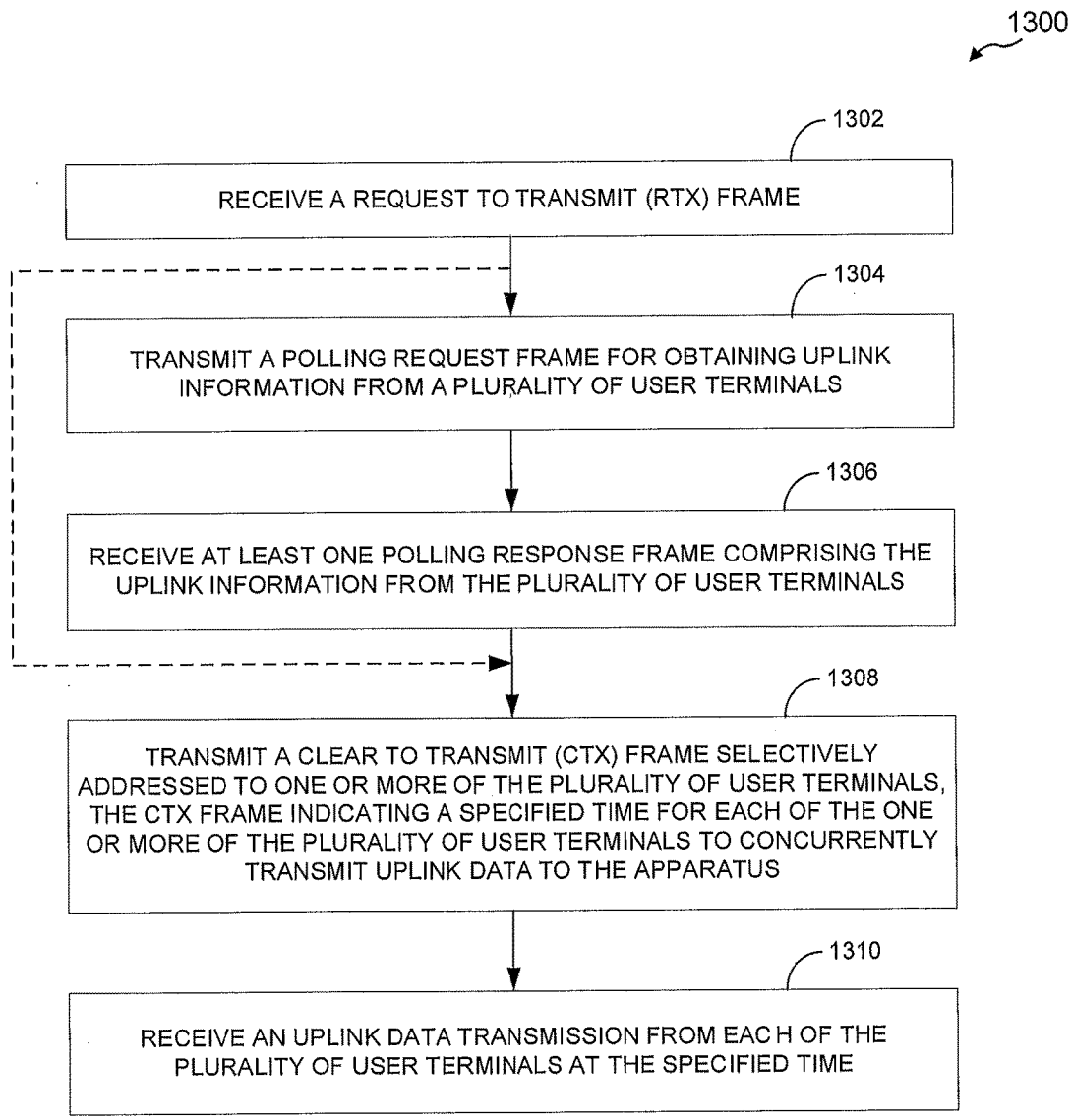
FIG. 13 is a flow chart illustrating another method for multiple-user wireless communication by an access point in user terminal initiated mode, in accordance with some implementations.

FIG. 13 is a flow chart 1300 illustrating another method for multiple-user wireless communication by an access point (e.g., the AP 102 of FIG. 1) in user terminal initiated mode, in accordance with some implementations, as previously described in connection with FIG. 4. In some implementations, as previously stated, the AP 102 may be implemented by the wireless device 252 of FIG. 2B. Accordingly, one or more of the steps in flowchart 1100 may be performed by, or in connection with, the AP MU control module 230 (e.g., one or both of the processor 254, which may include the trigger timer 258, and the memory 256) and/or the transmitter 210 or receiver 212 as previously described in connection with FIG. 2B. However, those having ordinary skill in the art will appreciate that other components may be used to implement one or more of the steps described herein. Although blocks may be described as occurring in a certain order, the blocks can be reordered, blocks can be omitted, and/or additional blocks can be added.

The flowchart 1300 may begin with block 1302, which may include receiving a request to transmit (RTX) frame. For example, the receiver 212 of the wireless device 252 (FIG. 2B) may be configured to receive the RTX frame 412 as previously described in connection with FIG. 4. In some implementations, a polling request frame may then be transmitted. In such implementations, the flowchart 1300 may proceed to block 1304. Otherwise, the flowchart 1300 may proceed directly to block 1308, as shown by the dotted arrow.

Block 1304 may comprise transmitting a polling request frame for obtaining uplink information from a plurality of user terminals. For example, the transmitter 210 of the wireless device 252 (FIG. 2B) may be configured to transmit the polling request frame 402 for obtaining uplink information from the user terminals 104A-104D (FIG. 1), as previously described in connection with FIG. 4. The flowchart 1300 may then proceed to block 1306.

Block 1306 may comprise receiving at least one polling response frame comprising the uplink information from the plurality of user terminals. For example, the receiver 212 of the wireless device 252 (FIG. 2B) may be configured to receive the polling response frame 404 from one or more of the user terminals 104A-104D (FIG. 1) as previously described in connection with FIG. 4. The flowchart 1300 may then proceed to block 1308.

Block 1308 may comprise transmitting a clear to transmit (CTX) frame selectively addressed to one or more of the plurality of user terminals, the CTX frame indicating a specified time for each of the one or more of the plurality of user terminals to concurrently transmit uplink data to the apparatus. For example, the transmitter 210 of the wireless device 252 (FIG. 2B) may be configured to transmit the CTX frame 406 as previously described in connection with FIG. 4. The term "selectively addressed to the plurality of user terminals" may indicate that less than all of the user terminals that originally transmit a polling response frame 404 are addressed in the CTX frame 406. The flowchart 1300 may then proceed to block 1310.

Block 1310 may comprise receiving an uplink data transmission from each of the plurality of user terminals at the specified time. For example, the receiver 212 of the wireless device 252 (FIG. 2B) may be configured to receive the MU-PPDU 408, which may include uplink data from more than one of the user terminals 104A-104D (FIG. 1) as previously described in connection with FIG. 4.

Figure 14:
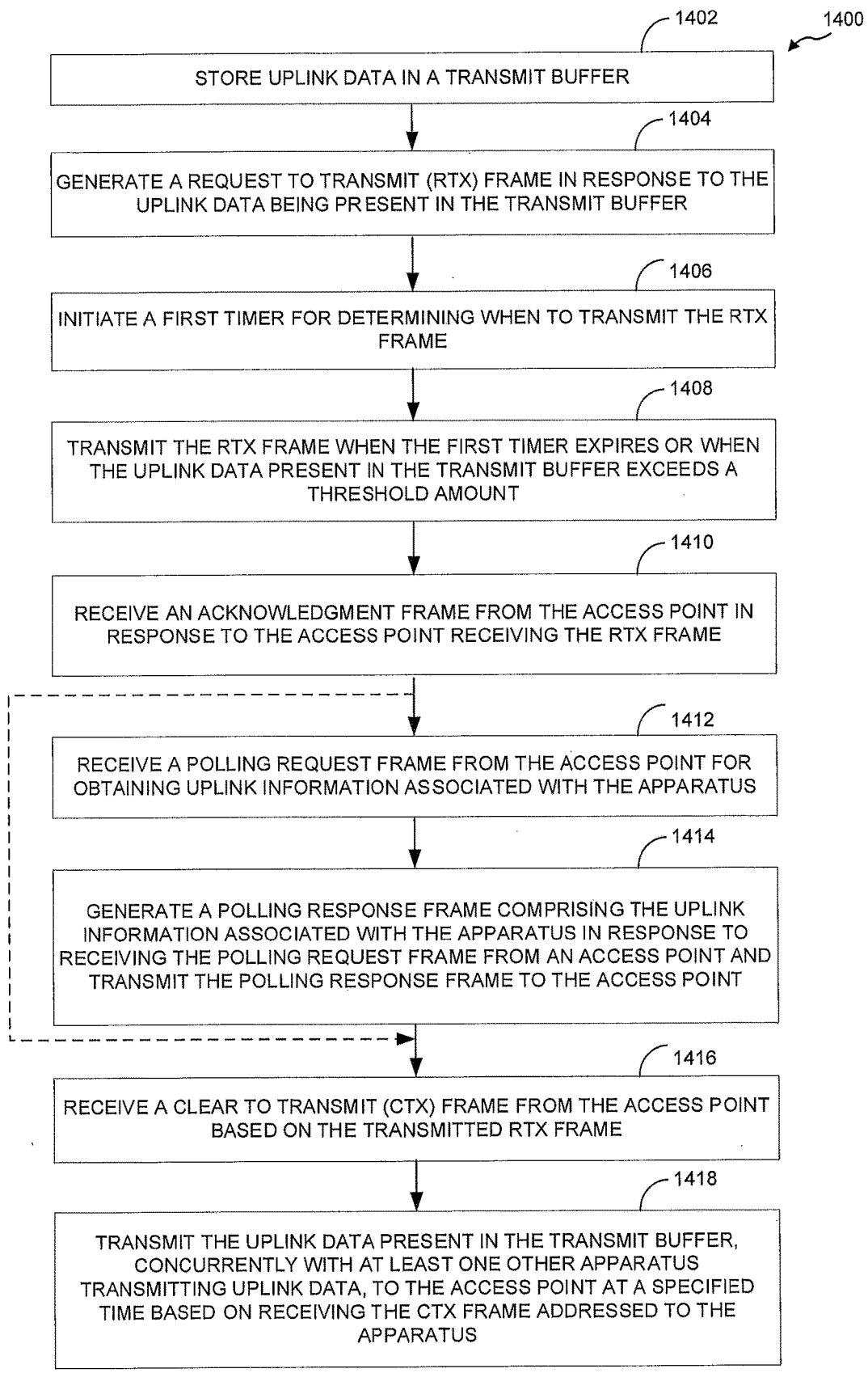
FIG. 14 is a flow chart illustrating another method for multiple-user wireless communication by a user terminal in a hybrid initiated mode, in accordance with some implementations.

FIG. 14 is a flow chart 1400 illustrating another method for multiple-user wireless communication by a user terminal (e.g., any of the user terminals 104A-104D of FIG. 1) in a hybrid initiated mode, in accordance with some implementations, as previously described in connection with FIG. 5. In some implementations, as previously stated, the user terminals 104A-104D may be implemented by the wireless device 202 of FIG. 2A. Accordingly, one or more of the steps in flowchart 1000 may be performed by, or in connection with, the UT MU control module 230 (e.g., one or more of the processor 204, which may comprise the transmit timer 227A-227D and the timeout timer 228A-228D, and the memory 206, which may comprise the transmit buffer 226A-226D) and/or the transmitter 210 or receiver 212 as previously described in connection with FIG. 2. However, those having ordinary skill in the art will appreciate that other components may be used to implement one or more of the steps described herein. Although blocks may be described as occurring in a certain order, the blocks can be reordered, blocks can be omitted, and/or additional blocks can be added.

The flowchart 1400 may begin with block 1402, which may include storing uplink data in a transmit buffer. For example, the wireless device 202 of FIG. 2A may be configured to store uplink data in the memory 206 for transmission to the AP 102 of FIG. 1. The flowchart 1400 may then proceed to block 1404.

Block 1404 may comprise generating a request to transmit (RTX) frame in response to the uplink data being present in the transmit buffer. For example, the processor 204 of the wireless device 202 (FIG. 2A) may be configured to generate the RTX frame 512A, 512B as previously described in connection with FIG. 5. The flowchart 1400 may then proceed to block 1406.

Block 1406 may comprise initiating a transmit timer for determining when to transmit the RTX frame. For example, the processor 204 of the wireless device 202 (FIG. 2A) may be configured to initiate the transmit timer 227A-227D as previously described in connection with FIG. 5. The flowchart 1400 may then proceed to block 1408.

Block 1408 may comprise transmitting the RTX frame when the transmit timer expires or when the uplink data present in the transmit buffer exceeds a threshold amount. For example, the transmitter 210 of the wireless device 202 (FIG. 2A) may be configured to transmit the RTX frame 512A, 512B when either the transmit timer 227A-227D counts down from "X" to zero, or when the uplink data in the transmission buffer exceeds the predetermined trigger level "Y" as previously described in connection with FIG. 5. The flowchart 1400 may then proceed to block 1412.

Block 1410 may comprise receiving an acknowledge frame from the access point in response to the access point receiving the RTX frame. For example, the receiver 212 of the wireless device 202 (FIG. 2A) may be configured to receive the ACK frame 514A, 514B as previously described in connection with FIG. 5.

In some implementations, the AP 102 may transmit a polling request after transmitting the ACK frame 514A, 514B (FIG. 5). In such implementations, the flowchart 1400 may proceed to block 1412. Otherwise, the flowchart 1400 may proceed directly to block 1416, skipping blocks 1412 and 1414, as shown by the dotted arrow. Block 1412 may comprise receiving a polling request frame from the access point for obtaining uplink information associated with the apparatus. For example, the receiver 212 of the wireless device 202 (FIG. 2A) may be configured to receive the polling request frame 502 as previously described in connection with FIG. 5. The flowchart 1400 may then proceed to block 1414.

Block 1414 may comprise generating a polling response frame comprising the uplink information associated with the apparatus in response to receiving the polling request frame from the access point and transmitting the polling response frame to the access point. For example, the processor 204 of the wireless device 202 (FIG. 2A) may be configured to generate the polling response frame 504 as previously described in connection with FIG. 5. The flowchart 1400 may then proceed to block 1416.

Block 1416 may comprise receiving a clear to transmit (CTX) frame from an access point. For example, the receiver 212 of the wireless device 202 (FIG. 2A) may be configured to receive the CTX frame 506 from the access point 102 (FIG. 1) as previously described in connection with FIG. 5. The flowchart 1400 may then proceed to block 1418.

Block 1418 may comprise transmitting the uplink data present in the transmit buffer, concurrently with at least one other apparatus transmitting uplink data, to the access point at a specified time based on receiving the CTX frame addressed to the apparatus. For example, the transmitter 210 of the wireless device 202 (FIG. 2A) may be configured to transmit the uplink data present in the memory 206, concurrently with at least one other of the user terminals 104A-104D (FIG. 1) transmitting uplink data, to the access point 102 (FIG. 1) at a specified time based on receiving the CTX frame 506 as previously described in connection with FIG. 5.

Figure 15:
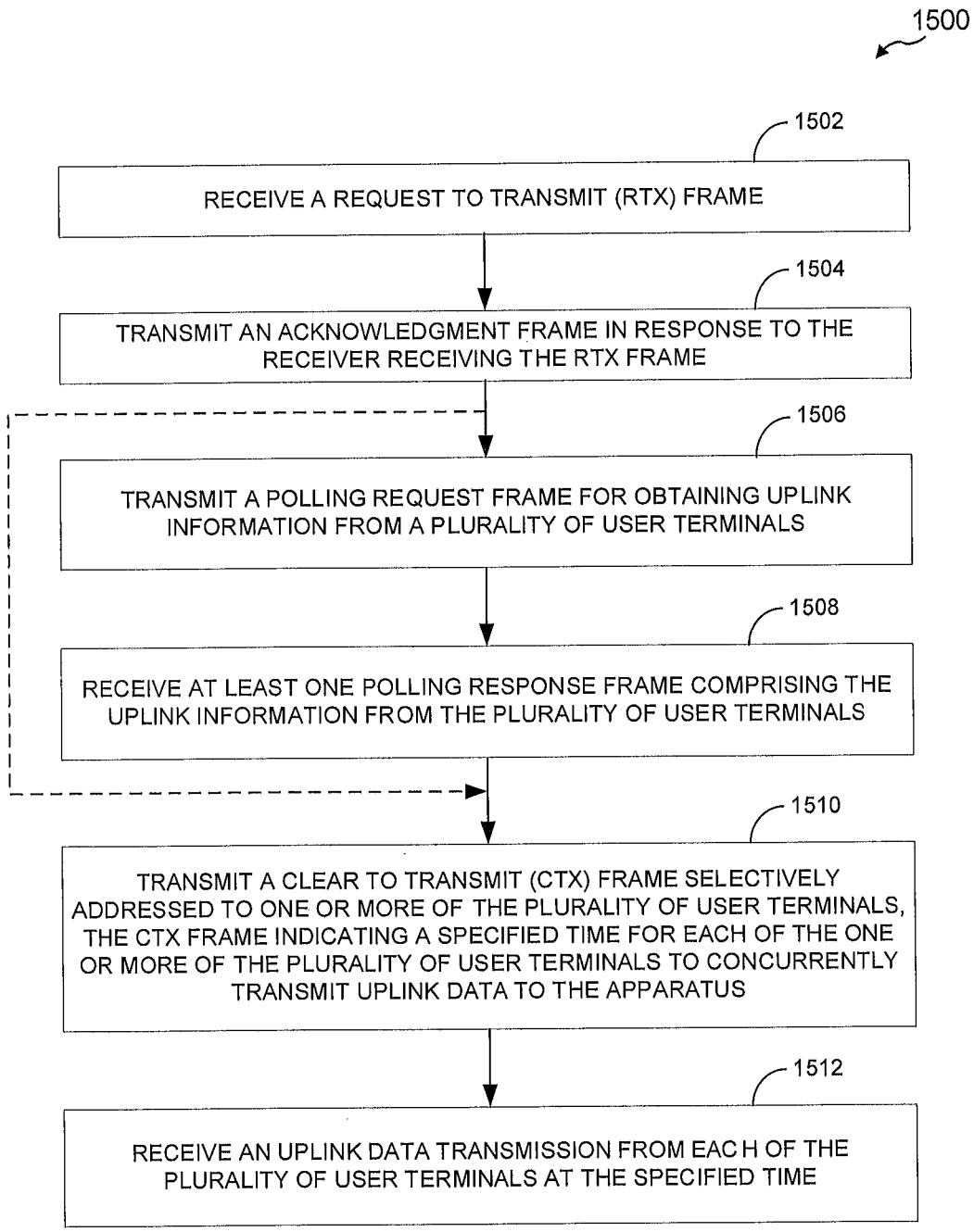
FIG. 15 is a flow chart illustrating another method for multiple-user wireless communication by an access point in a hybrid initiated mode, in accordance with some implementations.

FIG. 15 is a flow chart 1500 illustrating another method for multiple-user wireless communication by an access point (e.g., the AP 102 of FIG. 1) in a hybrid initiated mode, in accordance with some implementations, as previously described in connection with FIG. 5. In some implementations, as previously stated, the AP 102 may be implemented by the wireless device 252 of FIG. 2B. Accordingly, one or more of the steps in flowchart 1100 may be performed by, or in connection with, the AP MU control module 230 (e.g., one or both of the processor 254, which may include the trigger timer 258, and the memory 256) and/or the transmitter 210 or receiver 212 as previously described in connection with FIG. 2B. However, those having ordinary skill in the art will appreciate that other components may be used to implement one or more of the steps described herein. Although blocks may be described as occurring in a certain order, the blocks can be reordered, blocks can be omitted, and/or additional blocks can be added.

The flowchart 1500 may begin with block 1502, which may include receiving a request to transmit (RTX) frame. For example, the receiver 212 of the wireless device 252 (FIG. 2B) may be configured to receive the RTX frame 512A, 512B as previously described in connection with FIG. 5.

Block 1504 includes transmitting an acknowledge frame in response to the receiver receiving the RTX frame. For example, the transmitter 210 of the wireless device 252 (FIG. 2B) may be configured to transmit the acknowledge frame 514A, 514B in response to the receiver 212 receiving the RTX frame 512A, 512B. In some implementations, a polling request frame may then be transmitted. In such implementations, the flowchart 1500 may proceed to block 1506. Otherwise, the flowchart 1500 may proceed directly to block 1510, as shown by the dotted arrow.

Block 1506 includes transmitting a polling request frame for obtaining uplink information from the plurality of user terminals. For example, the transmitter 210 of the wireless device 252 (FIG. 2B) may be configured to transmit the polling request frame 502 for obtaining uplink information from the user terminals 104A-104D (FIG. 1), as previously described in connection with FIG. 5. The flowchart 1500 may then proceed to block 1508.

Block 1508 includes receiving at least one polling response frame comprising the uplink information from the plurality of user terminals. For example, the receiver 212 of the wireless device 252 (FIG. 2B) may be configured to receive the polling response frame 504 from one or more of the user terminals 104A-104D (FIG. 1) as previously described in connection with FIG. 5. The flowchart 1500 may then proceed to block 1510.

Block 1510 includes transmitting a clear to transmit (CTX) frame selectively addressed to one or more of the plurality of user terminals, the CTX frame indicating a specified time for each of the one or more of the plurality of user terminals to concurrently transmit uplink data to the apparatus. For example, the transmitter 210 of the wireless device 252 (FIG. 2B) may be configured to transmit the CTX frame 506 as previously described in connection with FIG. 5. The term "selectively addressed to one or more of the plurality of user terminals" may indicate that less than all of the user terminals that originally transmit a polling response frame 504 are addressed in the CTX frame 506. The flowchart 1500 may then proceed to block 1512.

Block 1512 includes receiving an uplink data transmission from each of the plurality of user terminals at the specified time. For example, the receiver 212 of the wireless device 252 (FIG. 2B) may be configured to receive the MU-PPDU 508, which may include uplink data from more than one of the user terminals 104A-104D (FIG. 1) as previously described in connection with FIG. 5.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor (e.g., any microprocessor, controller, microcontroller, or state machine), a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein.

In one or more aspects, the functions described may be implemented in hardware, software, firmware, or any combination thereof. If implemented in software, the functions may be stored on or transmitted over as one or more instructions or code on a computer-readable medium, which may include computer storage media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A user terminal for multiple-user wireless communication, comprising:
   a transmit buffer configured to store uplink data for transmission;
   a processor configured to:
      generate a request to transmit frame in response to uplink data being present in the transmit buffer, and
      initiate a transmit timer for determining when to transmit the request to transmit frame;
   a transmitter configured to transmit the request to transmit frame when the transmit timer expires or when the uplink data present in the transmit buffer exceeds a threshold amount; and
   a receiver configured to receive a clear to transmit frame from an access point based on the transmitted request to transmit frame, wherein the transmitter is configured to transmit the uplink data present in the transmit buffer, concurrently with at least one other user terminal transmitting uplink data, to the access point at a specified time based on receiving the clear to transmit frame addressed to the user terminal.

2. The user terminal of claim 1, wherein:
   the processor is further configured to initiate a timeout timer in response to the transmitter transmitting the request to transmit frame; and
   the transmitter is configured to retransmit the request to transmit frame in response to the receiver not receiving the clear to transmit frame before the timeout timer expires.

3. The user terminal of claim 1, wherein the receiver is further configured to receive an acknowledgment frame from the access point in response to the access point receiving the request to transmit frame.

4. The user terminal of claim 1, wherein at least one of a timeout value of the transmit timer and the threshold amount of the uplink data are configurable by one or both of the processor and the access point.

5. The user terminal of claim 1, wherein the receiver is further configured to receive a polling request frame from the access point for obtaining uplink information associated with the user terminal before the access point transmits the clear to transmit frame.

6. The user terminal of claim 5, wherein:
   the processor is configured to generate a polling response frame comprising the uplink information associated with the user terminal in response to the receiver receiving the polling request frame; and
   the transmitter is configured to transmit the polling response frame to the access point.

7. The user terminal of claim 6, wherein the processor is configured to insert the uplink information into one or more bits of one or both of a sequence control field or a quality of service control field of the polling response frame and wherein the uplink information comprises at least one of an amount of the uplink data present in the transmit buffer, an incoming traffic rate of the user terminal, a maximum wait time for sending the uplink data, a size of a media access control service data unit, a requested transmit opportunity length, and a modulation and coding scheme associated with the user terminal.

8. A method for multiple-user wireless communication by a user terminal, comprising:
   storing uplink data in a transmit buffer;
   generating a request to transmit frame in response to the uplink data being present in the transmit buffer;
   initiating a transmit timer for determining when to transmit the request to transmit frame;
   transmitting the request to transmit frame when the transmit timer expires or when the uplink data present in the transmit buffer exceeds a threshold amount;
   receiving a clear to transmit frame from an access point based on the transmitted request to transmit frame; and
   transmitting the uplink data present in the transmit buffer, concurrently with at least one other user terminal transmitting uplink data, to the access point at a specified time based on receiving the clear to transmit frame.

9. The method of claim 8, further comprising initiating a timeout timer upon transmitting the request to transmit frame and retransmitting the request to transmit frame if the clear to transmit frame is not received before the timeout timer expires.

10. The method of claim 8, further comprising receiving an acknowledgment frame from the access point in response to the access point receiving the request to transmit frame.

11. The method of claim 8, wherein at least one of a timeout value of the transmit timer and the threshold amount of the uplink data are configurable by the access point.

12. The method of claim 8, further comprising receiving a polling request frame from the access point for obtaining uplink information before the access point transmits the clear to transmit frame.

13. The method of claim 12, further comprising:
   generating a polling response frame comprising the uplink information in response to receiving the polling request frame from the access point, and
   transmitting the polling response frame to the access point.

14. The method of claim 13, wherein the uplink information comprises at least one of an amount of the uplink data present in the transmit buffer, an incoming traffic rate of the user terminal, a maximum wait time for sending the uplink data, a size of a media access control service data unit, a requested transmit opportunity length, and a modulation and coding scheme associated with the user terminal, the method further comprising inserting the uplink information associated with the user terminal into one or more bits of one or both of a sequence control field or a quality of service control field of the polling response frame.

15. An access point for multiple-user wireless communication, comprising:
   a processor configured to maintain a trigger timer for each of one or more of a plurality of user terminals and selectively address a clear to transmit frame to the one or more of the plurality of user terminals based on the trigger timer expiring;
   a transmitter configured to transmit the clear to transmit frame, the clear to transmit frame indicating a specified time for each of the one or more of the plurality of user terminals to concurrently transmit uplink data to the access point; and a receiver configured to receive an uplink data transmission from each of the one or more of the plurality of user terminals at the specified time.

16. The access point of claim 15, wherein the receiver is configured to receive a request to transmit frame before the transmitter transmits the clear to transmit frame.

17. The access point of claim 16, wherein the transmitter is further configured to transmit an acknowledgment frame in response to the receiver receiving the request to transmit frame.

18. The access point of claim 15, wherein:
the transmitter is configured to transmit a polling request frame for obtaining uplink information from the plurality of user terminals before transmitting the clear to transmit frame; and
the receiver is configured to receive at least one polling response frame comprising the uplink information from the plurality of user terminals.

19. The access point of claim 18, wherein the polling request frame comprises a null data packet.

20. The access point of claim 15, wherein the processor is further configured to
selectively address the clear to transmit frame based on one or more of a transmission efficiency of at least one of the plurality of user terminals exceeding a threshold, a decreasing order of time remaining on an unexpired trigger timer, a decreasing order of an amount of uplink data queued to be transmitted, and a decreasing order of transmission efficiency associated with the plurality of user terminals.

21. The access point of claim 20, wherein the processor is further configured to selectively address the polling request frame to each of the plurality of user terminals based on one or more of a buffer size, traffic pattern, sleep cycle, and received signal strength indicator of each of the plurality of user terminals.

22. The access point of claim 15, wherein the transmitter is further configured to transmit the clear to transmit frame when a transmission efficiency of at least one of the plurality of user terminals exceeds a threshold.

23. A method for multiple-user wireless communication by an access point, comprising:
maintaining a trigger timer for each of one or more of a plurality of user terminals;
selectively addressing a clear to transmit frame to the one or more of the plurality of user terminals based on the trigger timer expiring;
transmitting the clear to transmit frame, the clear to transmit frame indicating a specified time for each of the one or more of the plurality of user terminals to concurrently transmit uplink data to the access point; and
receiving an uplink data transmission from each of the one or more of the plurality of user terminals at the specified time.

24. The method of claim 23, further comprising receiving a request to transmit frame before transmitting the clear to transmit frame.

25. The method of claim 24, further comprising transmitting an acknowledgment frame in response to the receiver receiving the request to transmit frame.

26. The method of claim 23, further comprising:
transmitting a polling request frame for obtaining uplink information from the plurality of user terminals before transmitting the clear to transmit frame; and
receiving at least one polling response frame comprising the uplink information from the plurality of user terminals.

27. The method of claim 26, wherein the polling request frame comprises a null data packet.

28. The method of claim 23, wherein
selectively addressing the clear to transmit frame is based on one or more of a transmission efficiency of at least one of the plurality of user terminals exceeding a threshold, a decreasing order of time remaining on an unexpired trigger timer, a decreasing order of an amount of uplink data queued to be transmitted, and a decreasing order of transmission efficiency associated with the plurality of user terminals.

29. The method of claim 26, further comprising selectively addressing the polling request frame to each of the plurality of user terminals based on one or more of a buffer size, traffic pattern, sleep cycle, and received signal strength indicator of each of the plurality of user terminals.

30. The method of claim 23, wherein the clear to transmit frame is transmitted when a transmission efficiency of at least one of the plurality of user terminals exceeds a threshold.

* * * * *